(12) United States Patent
Suganuma et al.

(10) Patent No.: US 8,502,632 B2
(45) Date of Patent: Aug. 6, 2013

(54) TRANSFORMER, POWER CONVERTER, LIGHTING DEVICE, LIGHTING DEVICE FOR VEHICLE, AND VEHICLE USING THE SAME

(75) Inventors: Kazutoshi Suganuma, Toyonaka (JP); Tomoyuki Nakano, Sakai (JP); Toshiaki Nakamura, Kadoma (JP); Toshifumi Tanaka, Toyonaka (JP)

(73) Assignee: Panasonic Corporation, Osaka (JP)

( * ) Notice: Subject to any disclaimer, the term of this patent is extended or adjusted under 35 U.S.C. 154(b) by 375 days.

(21) Appl. No.: 12/988,894

(22) PCT Filed: Apr. 16, 2009

(86) PCT No.: PCT/JP2009/057691
§ 371 (c)(1),
(2), (4) Date: Oct. 21, 2010

(87) PCT Pub. No.: WO2009/131059
PCT Pub. Date: Oct. 29, 2009

(65) Prior Publication Data
US 2011/0037405 A1 Feb. 17, 2011

(30) Foreign Application Priority Data
Apr. 24, 2008 (JP) .................. 2008-114630

(51) Int. Cl.
*H01F 5/00* (2006.01)
*H01F 27/28* (2006.01)
*H01F 17/04* (2006.01)
(52) U.S. Cl.
USPC ............ 336/200; 336/220; 336/221; 336/232

(58) Field of Classification Search
USPC ............ 336/196, 200, 212, 220, 221, 222, 336/232
See application file for complete search history.

(56) References Cited

U.S. PATENT DOCUMENTS 4,873,757 A * 10/1989 Williams ............... 29/602.1
5,499,005 A * 3/1996 Gu et al. ............... 333/246

(Continued)

FOREIGN PATENT DOCUMENTS

JP 8-69935 A 3/1996
JP 9-97728 A 4/1997

(Continued)

OTHER PUBLICATIONS

International Search Report for the Application No. PCT/JP2009/057691 mailed Jul. 21, 2009.

*Primary Examiner* — Mohamad Musleh
*Assistant Examiner* — Joselito Baisa
(74) *Attorney, Agent, or Firm* — McDermott Will & Emery LLP

(57) ABSTRACT

A transformer in this invention comprises substrates constructing a primary winding, substrates constructing the secondary winding, and a core member disposed around the substrates. The substrates defining the primary winding are provided with insertion holes for passing a middle leg portion of the core member, and patterned conductors having one turn. The transformer further comprises an interlayer connection member. The interlayer connection member is located inwardly of the patterned conductors of the substrates defining the primary winding. The interlayer connection member is located on the same side of the patterned conductors defining the primary winding. The interlayer connection member is configured to establish the electrical connection of the patterned conductors defining the primary winding.

12 Claims, 49 Drawing Sheets

U.S. PATENT DOCUMENTS

| | | | |
|---|---|---|---|
| 5,521,573 A * | 5/1996 | Inoh et al. | 336/180 |
| 5,952,909 A | 9/1999 | Umeno et al. | |
| 6,000,128 A | 12/1999 | Umeno et al. | |
| 6,040,659 A | 3/2000 | Masuda et al. | |
| 6,073,339 A * | 6/2000 | Levin | 29/606 |
| 6,281,779 B1 * | 8/2001 | Matsumoto et al. | 336/200 |
| 6,429,763 B1 * | 8/2002 | Patel et al. | 336/200 |
| 6,831,544 B2 * | 12/2004 | Patel et al. | 336/200 |
| 7,248,138 B2 * | 7/2007 | Chiang et al. | 336/200 |
| 7,304,862 B2 * | 12/2007 | Busletta et al. | 361/760 |
| 7,827,560 B2 * | 11/2010 | Bayer | 718/107 |
| 2005/0270745 A1 | 12/2005 | Chen et al. | |

FOREIGN PATENT DOCUMENTS

| | | |
|---|---|---|
| JP | 9-326315 A | 12/1997 |
| JP | 11-87156 A | 3/1999 |
| JP | 2003-272929 A | 9/2003 |
| JP | 2008-502293 A | 1/2008 |

* cited by examiner

TRANSFORMER, POWER CONVERTER, LIGHTING DEVICE, LIGHTING DEVICE FOR VEHICLE, AND VEHICLE USING THE SAME

TECHNICAL FIELD

This invention relates to a transformer, a power converter using the transformer, a lighting device using the transformer, a lighting device for vehicle using the transformer, and a vehicle using the transformer.

BACKGROUND ART

Traditionally, various sorts of the transformer having a winding realized by a patterned conductor on the sheet substrate is produced (for example, in the patent literature 1 and the patent literature 2).

FIG. 29 shows a sheet substrate which constructs a part of the transformer. The prior transformer comprises two sheet substrates 101, 103, and two sheet substrates 102, 104. The two sheet substrates 101, 103 construct the first winding. The two sheet substrates 102, 104 construct the second winding. The sheet substrates 101, 102, 103, and 104 are formed at its center with through holes 101a, 102a, 103a, and 104a, respectively. The through holes 101a, 102a, 103a, and 104a penetrate through the sheet substrates 101, 102, 103, and 104, respectively. The through holes 101a, 102a, 103a, and 104a have rectangular shapes, respectively. The through holes 101a, 102a, 103a, and 104a are surrounded by the patterned conductors 107, 108, 109, and 110, respectively.

In addition, the transformer further comprises interlayer connection members 116. The interlayer connection members 116 is disposed between the patterned conductor 107 and the through hole 101a of the sheet substrate 101. The interlayer connection member 116 is also disposed between the patterned conductor 109 and the through hole 103a of the sheet substrate 103. The interlayer connection members 116 are configured to connect the patterned conductor 108 and the patterned conductor 110 which construct the second winding. Furthermore, the transformer comprises interlayer connection member 112. The interlayer connection member 112 is disposed between the patterned conductor 108 and the through hole 102a of the sheet substrate 102. The interlayer connection member 112 is also disposed between the patterned conductor 110 and the through hole 104a of the sheet substrate 104. The interlayer connection members 112 are configured to electrically connect the patterned conductor 107 to the patterned conductor 109 which constructs the first winding.

The sheet substrates 101, 102, 103, and 104 are stacked in order. Subsequently, the sheet substrates and a pair of cores 105a, 105a are put together such that one of the cores 105 is attached to the sheet substrates from an upper side and the other of the cores 105 is attached to the sheet substrates from a lower side. Each the core 105a has an E-shape. Consequently, the transformer is assembled. (Refer to FIG. 29 B and FIG. 29 C.)

Patent Literature
[Patent literature 1] Japanese patent application publication No. 9-326315A, especially [0008] to [0010] and FIG. 1 and FIG. 2.
[Patent literature 2] Japanese patent application publication No. 2003-272929, especially [0028] to [0044] and FIG. 1 to FIG. 6.

DISCLOSURE OF THE INVENTION

Problem to be Resolved by the Invention

The transformer shown in FIG. 29 comprises the interlayer connection members 112 and the interlayer connection members 116. The interlayer connection members 112 are disposed between each one of the through holes 101a, 102a, 103a, and 104a, and each one of the patterned conductors 107, 108, 109, and 110. The patterned conductors 107, 108, 109, 110 correspond to the through holes 101a, 102a, 103a, and 104a, respectively. The interlayer members 116 are disposed between each one of the insertion holes 101a, 102a, 103a, and 104a, and each one of said patterned conductor 107, 108, 109, 110. It is required to keep a predetermined electrical insulation distance between each one of the interlayer connection member 112, 116 and each one of the patterned conductor 107, 108, 109, 110. In order to keep a predetermined electrical insulation distance, there is a need for the patterned conductors 107, 108, 109, and 110 to make curvatures. As a result, the sheet substrates 101, 102, 103, and 104 are enlarged. In addition, resistance value of the winding is increased. Furthermore, because each one of the first winding and the second winding is distanced from the core member 105, there is a possibility of increasing the leakage inductance. Especially, when the winding receives the high voltage, there is a need to increase the electrically insulation distance. The large electrically insulation distance affects the above influence dominantly.

The invention is achieved to solve the above problem. An object in this invention is to produce a transformer having a compact size, to keep the electrically insulation distance between the first winding and the second winding, and to prevent the increase of the leakage inductance. Furthermore, an object in this invention is to produce a power converter, a lighting device, a lighting device for vehicle, and vehicle using the transformer.

Means of Solving the Problem

The transformer in this invention comprises a winding member and a core member. The core member is made of magnetic material. The core member is disposed around the winding member such that the core member forms a magnetic path. The winding member comprises a first substrate and at least two second substrates which are stacked. Each one of the first substrate and the second substrate is provided with an insertion hole and a patterned conductor. The patterned conductor surrounds the insertion hole. The insertion hole is provided for passing a middle leg portion of the core member. The patterned conductor of the first substrate is defined by a one-turn patterned conductor which has one turn, whereby the patterned conductor of the first substrate defines a first winding. The patterned conductor of each the second substrate defines a second winding. The transformer further comprises an interlayer connection member which is configured to electrically connect the patterned conductors of the second substrate to each other. The interlayer connection member is located inwardly of the one-turn patterned conductor. The interlayer connection member is located in an end side of the one-turn patterned conductor.

Under this configuration, the both ends of the one-turn patterned conductor essentially require the space providing the electrically insulation distance therebetween. The interlayer connection member for the second winding is disposed in the space. Consequently, it is possible for the first winding and the second winding to share the space as the electrically insulation space. As a result, it is possible to secure the electrically insulation distance between "the interlayer connection member" and "the both the patterned conductors" and to decrease an electrically insulation region of the substrate, compared with the prior art. Consequently, it is possible to downsize the substrate. In addition, there is no need for the second winding to make curvature. Therefore, it is possible to improve the coupling between the second winding and the core member. In addition, the first winding is realized by one substrate having one turn. Therefore, there is a high coupling between the core member and the first winding over an entire length. Consequently, even if a part of the first winding is made curvature, this configuration hardly causes the lowering of the coupling. Therefore, it is possible to improve the coupling between the first winding and the core member.

It is preferred that the first substrate is provided with first connection terminals which are connected to ends of the first winding, respectively. The second substrate is provided with second connection terminals which are connected to ends of the second winding, respectively. The first connection terminals are opposite of the second connection terminals from the insertion hole.

With this configuration, it is possible to easily secure the electrically insulation distance between the first connection terminal and the second connection terminal.

Similarly, it is preferred that the first substrate is provided with first connection terminals which are connected to ends of the first winding, respectively. The second substrate is provided with second connection terminals which are connected to ends of the second winding, respectively. The first connection terminals and the second connection terminals are disposed on a same side of the insertion hole.

According to the configuration of that the first connection terminals and the second connection terminals are disposed on a same side of the insertion hole, there is a space being opposite of the first connection terminals and also the second connection terminals. The space makes it possible to employ the thick patterned conductor. Therefore, this configuration makes it possible to improve the coupling between the core member and each the windings. In addition, if the thick patterned conductor is not employed, it is possible to downsize the substrate by the space.

It is preferred that the winding member comprises an even number of the second substrate.

According to the configuration of that the winding member comprises an even number of the second substrate, the total number of the turn of the second winding is an integral number. Therefore, it is possible to obtain the uniform magnetic flux, and to prevent the loss of the output.

It is preferred that the interlayer connection member is disposed within a region surrounded by three planes. The three planes are perpendicular to the first substrate and the second substrate. The three planes comprise a first plane, a second plane, and a third plane. The first plane passes through two points composed of the first point and the second point. The second plane passes through two points composed of the second point and the third point. The third plane passes through two points composed of the third point and the first point. The first point is defined by a width center of a first end of the first winding which is pulled out from the core member. The second point is defined by a width center of a second end of the first winding which is pulled out from the core member. The third point is defined by a center of a cross section of the magnetic path formed by the middle leg portion.

When the distance between the interlayer connection member and the core member is increased, there is a need for the patterned conductor of the second substrate connected to the interlayer connection member to make curvature. The curvature of the patterned conductor of the second substrate causes the decrease of the coupling between the second winding and the core member. However, the configuration of that the interlayer connection member is disposed within the above region makes it possible to prevent the curvature of the patterned conductor of the second substrate. As a result, it is possible to prevent the decrease of the coupling between the second winding and the core member.

It is preferred that the interlayer connection member and the third point are arranged in a predetermined direction. A connection line which connects the first point to the second point is spaced from the core member by a first distance in the predetermined direction. The connection line is located in a plane along a surface of the first substrate. The first distance is equal to or more than one-half of a width of the cross section of the magnetic path in the middle leg portion.

With this configuration, it is possible to increase the freedom of the arrangement of the interlayer connection member, compared with a case where the first distance is smaller than one-half of a width of the cross section of the magnetic path in the middle leg portion.

It is preferred that the interlayer connection member is disposed such that a distance between an end portion of the interlayer connection portion on the side of middle leg portion and an end portion of the middle leg portion on the side of the interlayer connection member is equal to or more than 0.5 mm.

It is preferred that the interlayer connection member is disposed in a predetermined substrate which belongs to the first substrates or the second substrate. The predetermined substrate is different from the substrate next to the first substrate and the second substrate.

If the interlayer connection member is provided to the substrate adjacent to the core member, there is a need to employ the means of interposing the electrically insulation member between the core member and the interlayer connection member in order to secure the electrically insulation distance. This results in the increase of the cost and in the increase of the size of the transformer. According to the configuration of that the interlayer connection member is provided to the substrate other than the substrate next to the core member, there is no need to employ the above electrically insulation member. This results in the decrease of the cost and in the prevention of the increase of the size of the transformer.

It is preferred that the winding member comprises a plurality of said first substrates and a plurality sort of said second substrates. A plurality of the second substrates are different in the number of turn from each other, whereby the second substrates includes a most-turn substrate. The most-turn substrate has the most number of turn. The most-turn substrate is disposed between the first substrates.

The configuration of that the most-turn substrate is disposed between the first substrates makes it possible to improve the coupling between the first winding and the second winding, compared with a case where the second substrate having a small number of turn is interposed between the first substrates.

It is preferred that a power conversion device comprises a power conversion circuit of the above transformer. At least one of the first substrate and the second substrate mounts a circuit component which constructs the power conversion circuit.

The configuration of employing the transformer makes it possible to produce the power conversion device of small size and to prevent the loss of the output of the power. Furthermore, at least one of the first substrates and the second substrates is capable of mounting the circuit component which constructs the power converter circuit. This results in the increase of the dimension of the heat radiation. Therefore, it is possible to improve the heat radiation property of the heat generated in the first winding and the second winding.

It is preferred that the lighting device in this invention comprises the lighting circuit employing the above transformer. At least one of the first substrate and the second substrate mounts the circuit component which constructs the lighting circuit.

With this configuration, it is possible to produce the lighting device having a small size, and to prevent the loss of the output by employing the transformer. Furthermore, it is possible to mount the circuit component constructing the lighting circuit on at least one of the first substrate and the second substrate. This results in the increase of dimension of the heat radiation. That is to say, this configuration makes it possible to improve the heat radiation property of the heat generated in the first winding and the second winding.

The lighting device for the vehicle in this invention is capable of mount the above lighting device.

With this configuration, it is possible to realize the lighting device for vehicle having a small size, and to improve the heat radiation property.

The vehicle in this invention employs the above lighting device for the vehicle.

With this configuration, it is possible to dispose the lighting device for the vehicle within the space having a high temperature, such as engine room.

BRIEF EXPLANATION OF THE DRAWINGS

FIG. 1 B shows a perspective view of the winding member of the transformer in the first embodiment.

FIG. 3 B shows a front view of the sheet substrate used as the winding member of the above in another embodiment.

FIG. 5 B shows a perspective view of the transformer in the second embodiment.

FIG. 6 B shows a circuit diagram of the DC-DC converter.

FIG. 8 B shows a mounting example of the DC-DC converter of the transformer in the second embodiment.

FIG. 10 B shows a perspective view of the transformer in the third embodiment.

FIG. 14 B shows a front view of the above in another embodiment.

FIG. 16 B shows a perspective view of the winding member of the transformer.

FIG. 17 B shows a perspective view of the winding member of the transformer of the above.

FIG. 19 B shows an exploded perspective view of the winding member of the transformer in the seventh transformer.

FIG. 20 B shows an explanation illustration explaining the method of forming the insulation distance between the interlayer connection member and the core member of the above.

FIG. 20 C shows an explanation illustration explaining the method of forming the insulation distance between the interlayer connection member and the core member of the above.

FIG. 21 B shows an exploded perspective view of the winding of the transformer in the eighth embodiment.

FIG. 23 B shows an exploded perspective view of the winding member of the above.

FIG. 24 B shows an exploded perspective view of the winding of the transformer of the ninth embodiment.

FIG. 25 B shows a circuit diagram of the power converter in the tenth embodiment.

FIG. 26 B shows a mounting example of the electrical component which constructs the lighting device.

FIG. 26 C shows a mounting example of the electrical components which constructs the lighting device.

FIG. 29 B shows a perspective view of the winding member of the transformer in the prior art.

FIG. 29 C shows a cross sectional view in the longitudinal direction of the transformer.

BEST MODE FOR CARRYING OUT THE INVENTION

Hereinafter, a transformer, a power converter, a lighting device, a lighting device for vehicle, and a vehicle of this invention is explained in the following embodiment with attached drawings.

First Embodiment

Figure 1A:
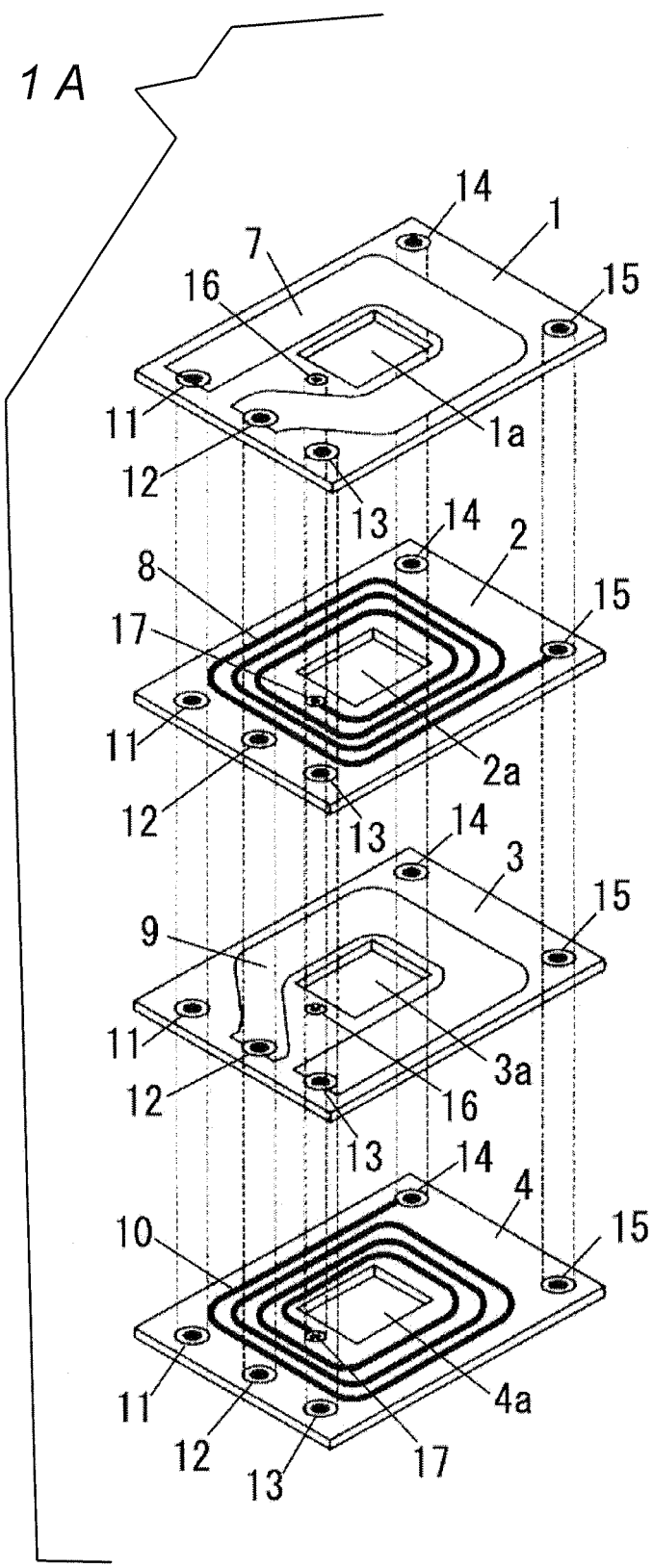
FIG. 1 A shows an exploded perspective view of the winding member of the transformer in the first embodiment.
Figure 1B:
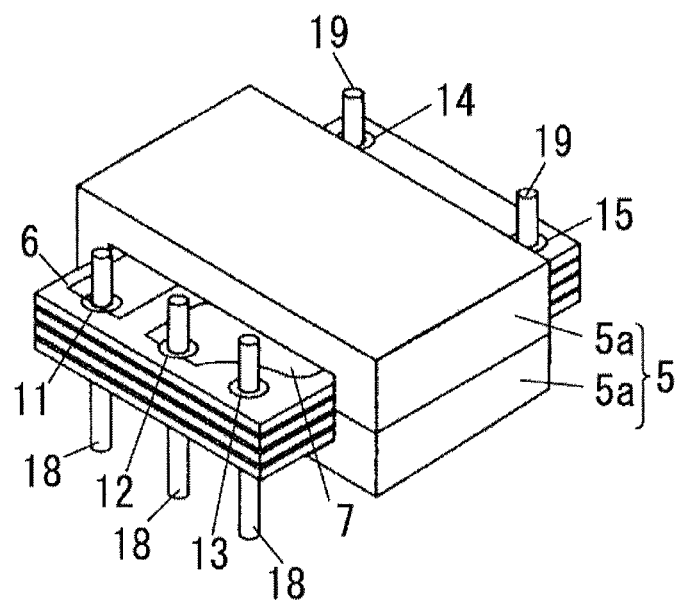

The transformer in this embodiment is shown in FIG. 1 A and FIG. 1 B. The transformer comprises a winding member 6, core members 5, connection pins 18, and connection pins 19. The core members 5 is attached to the winding member such that the winding member is interposed between an upper side of the core member 5 and the lower side of the core member 5. Each one of the connection pins 18 is connected to each one of the connection terminal 11, 12, and 13 such that each one of the connection pins 18 passes through each one of the connection terminals 11, 12, and 13. Each one of the connection pin 19 is connected to each one of the connection terminals 14 and 15 such that each one of the connection pin 19 passes through each one of the connection terminals 14 and 15. Each the connection pin 18 is inserted into through holes of the connection terminal 11, 12, and 13, and fixed to the substrate by a material such as solder. Each the connection pin 19 is inserted into through holes of each the connection terminals 14 and 15, and fixed to the substrate by the material such as solder.

The winding member 6, as shown in FIG. 1 A, comprises a substrate 1, a substrate 3, a substrate 2, and a substrate 4. The substrate 1 and the substrate 3 construct the first winding. The substrate 2 and the substrate 4 construct the second winding. The substrate 1, the substrate 2, the substrate 3, and the substrate 4 are stacked from the upper side in order.

The substrate 1 is, for example, a sheet substrate having a rectangular shape, whereby the sheet substrate has a horizontally long shape. The substrate 1 is formed at its center with an insertion hole 1a which passes through the substrate 1. The insertion hole 1a is provided for passing a middle leg portion (not shown in the drawings) of the core member 5. In addition, the substrate 1 is provided with a patterned conductor 7 which surrounds the insertion hole 1a of the substrate 1. The patterned conductor 7 has a number of turn which is equal to one. In addition, the substrate 1 is provided with one longitudinal end which is defined as a first end, and the other longitudinal end which is defined as a second end. The first end corresponds to the left end in FIG. 1 A. The first end is provided with a connection terminal 12. The connection terminal 12 is provided for electrically connects the connection terminals 11, 13 to a patterned conductor 9 and to the patterned conductor 7. The connection terminals 11, 13 are connected to ends of the first winding, respectively. It is noted that the patterned conductor 9 of the substrate 3 is explained hereinafter. In addition, the second end of the substrate 1 is formed with connection terminals 14, 15. The connection terminals 14, 15 are connected to ends of the second winding, respectively. That is to say, in this embodiment, the connection terminal 11, 13 disposed in a position such that the connection terminal 11, 13 is opposite of the connection terminal 14, 15 from the insertion hole 1a. Therefore, the patterned conductor 7, 9 which construct the first winding are drawn out to a position which is opposite of patterned conductors 8, 10 which construct the second winding in the longitudinal direction of the substrate 1. It is noted that the patterned conductors 8, 10 are explained hereinafter.

In addition, the substrate 1 is provided with an interlayer connection member 16. The interlayer connection member 16 is located inwardly of the patterned conductor 7, and is located in an end of the patterned conductor 7. (In FIG. 1 A, the end of the patterned conductor 7 is defined as a left side of FIG. 1 A.) The interlayer connection member 16 is configured to electrically connect the patterned conductor of the substrate 2 and the patterned conductor 10 of the substrate 4. It is noted that the first end of the patterned conductor 7 is connected to the connection terminal 11. The second end of the patterned conductor 7 is connected to the connection terminal 12. The patterned conductor 7 is surrounds the insertion hole 1a such that the patterned conductor 7 turns around the insertion hole 1a once. As will be understood from the embodiment, the connection terminals 11, 13 define the first connection terminal. The connection terminals 14, 15 define the second connection terminal.

The substrate 3 is a sheet substrate which is shaped to have a rectangular shape. The substrate 3 has a dimension which is approximately equal to a dimension of the substrate 1. The substrate 3 is shaped to have a horizontally long shape. The substrate 3 is provided at its center with an insertion hole 3. The insertion hole 3 has a rectangular shape, and passes through the substrate 3. The insertion hole 3 of the substrate 3 is located in a position approximately corresponding to the insertion hole 1a. In addition, the substrate is provided with a patterned conductor 9. The patterned conductor 9 surrounds the insertion hole 3a of the substrate 3. The patterned conductor 9 has the number of the turn which is equal to one. Furthermore, the substrate 3 has one longitudinal end which is defined as a first end, and has the other longitudinal end which is defined as a second end. (The first end of the substrate 3 corresponds to the left end of FIG. 1 A). The first end of the substrate 3 is provided with connection terminals 11 to 13 which is located in positions, similar to the substrate 1. The second end of the substrate is provided with connection terminals 14, 15 which are located in positions, similar to the substrate 1. In addition, the substrate 3 is provided with an interlayer connection member 16. The interlayer connection member 16 is located inwardly of the patterned conductor 9. The interlayer connection member 16 is located in a same side of the substrate 1. (The interlayer connection member 16 is located in the left side in FIG. 1 A.) The first end of the patterned conductor 9 is connected to the connection terminal 12. The patterned conductor 9 is shaped such that the patterned conductor surrounds the insertion hole 3a once. The second end of the patterned conductor 9 is connected to the connection terminal 13.

The substrate 2 is a sheet substrate having a rectangular plate shape, whereby the substrate 2 has a horizontally long shape. The substrate 2 has a dimension which is approximately equal to the dimension of the substrate 1. The substrate 2 is provided at its center with an insertion hole 2a. The insertion hole 2a passes through the substrate 2. The insertion hole 2a has a rectangular shape. The insertion hole 2a is shaped to have a dimension which is approximately equal to the insertion hole of the insertion hole 1a. The substrate 2 is provided with a patterned conductor 8 which surrounds the insertion hole 2a of the substrate 2. The patterned conductor has 3.5 turns. In addition, the substrate 2 is provided at its one longitudinal end with a first end, and its the other longitudinal end with a second end. (The first end corresponds to the left end of FIG. 1 A.) The first end of the substrate 2 is provided with connection terminals 11 to 13 which are located in positions similar to the substrate 1. The second end of the substrate 2 is provided with connection terminals 14, 15 which is located in positions similar to the substrate 1. The substrate 2 is provided with an interlayer connection member 17. The interlayer connection member 17 is located in a position which corresponds to the position of the interlayer connection member 16. The interlayer connection member 17 is electrically connected to the interlayer connection member 16. The first end of the patterned conductor 8 is connected to the interlayer connection member 17. The patterned conductor 8 is shaped such that the patterned conductor 8 surrounds the insertion hole 2a in a counterclockwise direction. The second end of the patterned conductor 8 is connected to the connection terminal 15.

The substrate 4 is a sheet substrate having a rectangular plate shape, whereby the substrate 4 has a horizontally long shape. The substrate 4 has a dimension which is approximately equal to the dimension of the substrate 1. The substrate 4 is provided at its center with an insertion hole 4a. The insertion hole 4a is shaped to have a rectangular shape. The insertion hole 4a is located in a position corresponding to the position of the insertion hole 1a. The substrate 4 is provided with a patterned conductor which surrounds the insertion hole 4a. The patterned conductor has 3.5 turns. The substrate 4 is provided at its one longitudinal end with a first end, and at its the other longitudinal end with a second end. (The first end of the substrate 4 corresponds to the left end of FIG. 1 A.) The first end of the substrate 4 is provided with connection terminals 11 to 13 which are positioned similar to the substrate 1. The second end of the substrate 4 is provided with connection terminals 14, 15 which are positioned similar to the substrate 1. The substrate 4 is provided with an interlayer connection member 17. The interlayer connection member 17 is located in a position corresponding to the position of the interlayer connection portion 16. The interlayer connection member 17 is electrically connected to the interlayer connection member 16. It is noted that the patterned conductor 10 is provided with a first end which is connected to the connection terminal 14. The patterned conductor 10 is shaped to surround the insertion hole 4a in the counterclockwise direction. The patterned conductor 10 is provided with a second end which is connected to the interlayer connection member 17.

Figure 2:
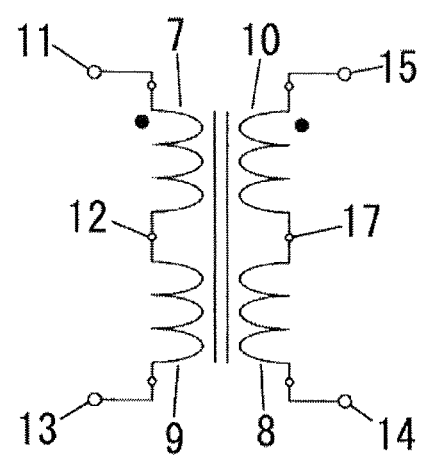
FIG. 2 shows a circuit diagram of the above.

When the substrates 1, 2, 3, and 4 are stacked, the insertion hole 1a of the substrate 1 is communicated with the insertion holes 2a, 3a, and 4a of the substrate 2, 3, and 4 in a vertical direction. In addition, when the substrate 1, 2, 3, and 4 are stacked, the connection terminals 11 are electrically connected to each other. In addition, when the substrate 1, 2, 3, and 4 are stacked, the connection terminals 12 are electrically connected to each other. In addition, when the substrate 1, 2, 3, and 4 are stacked, the connection terminals 13 are electrically connected to each other. In addition, when the substrate 1, 2, 3, and 4 are stacked, the connection terminals 14 are electrically connected to each other. In addition, when the substrate 1, 2, 3, and 4 are stacked, the connection terminals 15 are electrically connected to each other. Furthermore, when the substrate 1, 2, 3, and 4 are stacked, the interlayer connection member 16 is electrically connected to the interlayer connection member 17. Therefore, when the substrates 1, 2, 3, and 4 are stacked, the patterned conductor 7 is electrically connected to the patterned conductor 9 through the connection terminal 12, whereby the patterned conductor 9 is cooperative with the patterned conductor 7 to construct one patterned conductor. In addition, the patterned conductor 8 is electrically connected to the patterned conductor 10 through the interlayer connection member 16 and the interlayer connection member 17 to construct one patterned conductor. With this configuration, in this embodiment, the patterned conductor 7 is cooperative with the patterned conductor 9 to form one patterned conductor which is defined as a primary winding (in other words, a first winding). In addition, the patterned conductor 8 is cooperative with the patterned conductor 10 to form one patterned conductor which is defined as a secondary winding (in other words, a second winding). (The primary winding and the secondary winding is shown in FIG. 2). In addition, in this embodiment, the substrate 1 is cooperative with the substrate 3 to construct the first substrate. The substrate 2 is cooperative with the substrate 4 to construct the second substrate. In this embodiment, the primary winding has two turns. The secondary winding has seven turns.

The core member 5 comprises two cores 5a, 5a which are made of magnetic material such as ferrite. Each one of the cores 5a, 5a is shaped to have approximately E shape. The cores 5a and 5a are combined with each other such that the stacked substrates 1 to 4 are interposed between the cores 5a and 5a in the vertical direction. Consequently, as shown in FIG. 1 B, the cores 5a, 5a are attached to the winding member 6 such that the cores 5a, 5a surround the substrates 1 to 4 in the lateral direction (width direction). Under this condition, both the longitudinal ends of the substrate are projected outwardly of the core member 5. Consequently, the middle leg portion of each the cores 5a (which is not shown in the drawing) is passed through the insertion holes 1a to 4a, whereby the middle leg portions forms the magnetic path.

Figure 4:
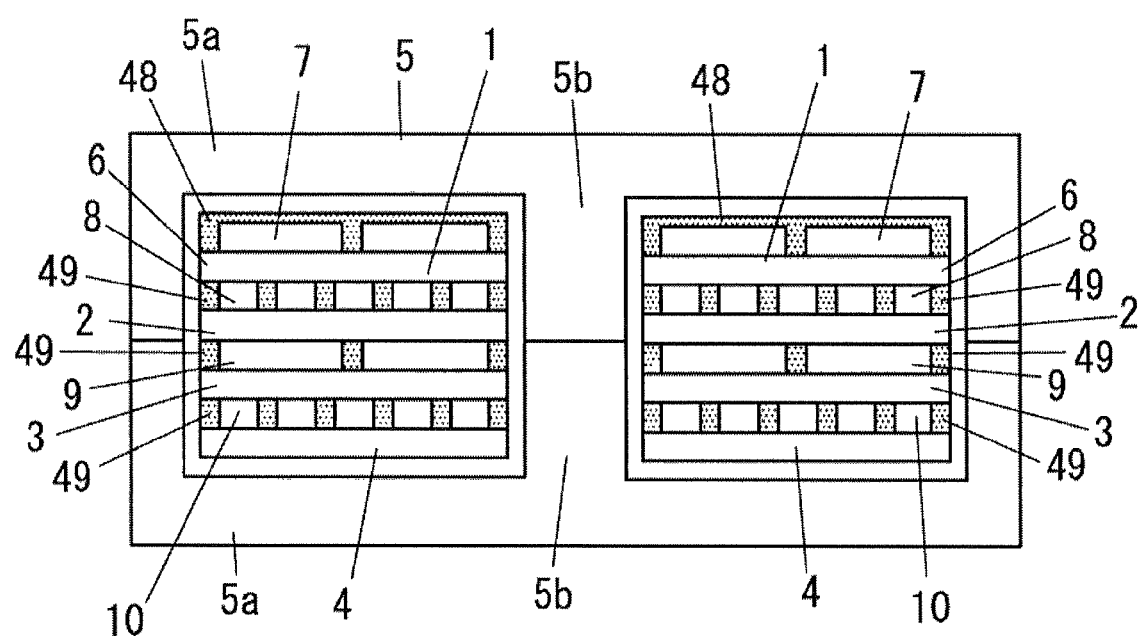
FIG. 4 shows an explanation illustration explaining an insulation distance of the sheet substrate.

Next, the electrically insulation distance is explained with the transformer in this embodiment. FIG. 4 shows a cross sectional view of the transformer in this embodiment. The stacked substrate has a surface (which is defined by the surface of the substrate 1 in this embodiment). The surface of the stacked substrate is provided with a resist 48 which is a resist material. The resist 48 has a effective value of dielectric strength voltage equal to or more than 20 kV/mm and equal to or less than 30 kV/mm. In addition, the interlayer is sealed by the electrically insulation layer 49. In a condition where the interlayer is a glass epoxy substrate, a prepreg having the effective value of dielectric strength voltage equal to or more than 30 kV/mm and equal to or less than 50 kV/mm is used as the electrically insulation layer 49.

However, the prepreg and the resist material are made of resin material. Therefore, there is a possibility of causing a leak due to the void. Therefore, generally, the prepreg and the resist material do not have guaranteed value as the dielectric strength voltage. Therefore, when the transformer having the stacked sheet substrates is designed like this embodiment, it is required to consider that there is no electrically insulation layer. Therefore, it is required to provide the electrically insulation distance.

When there is a potential difference of 1 kV between the conductors, it is required to leave a space between "the conductors which are not covered by the electrically insulation layers" by 1 mm. However, when the numerical value is applied to the transformer, the dimension and the thickness direction of the sheet substrate is enlarged. As a result, the size of the transformer is increased. Furthermore, when the distance between the conductors is increased, the inductive coupling between the primary winding and the secondary winding is decreased. This results in increase of loss of the output power.

In view of the above, in this embodiment, the electrically insulation distance is determined on the basis of reference values defined by "the dielectric strength voltage (1)" and "the dielectric strength voltage (2)". The dielectric strength voltage (1) is "equal to or more than 20 kV/mm" and "equal to or less than 30 kV/mm" of the resist material with respect to the substrate 1 being provided at its outside with a patterned conductor. The dielectric strength voltage (2) is "equal to or more than 30 kV/mm" and "equal to or less than 50 kV/mm" of the prepreg with respect to the substrates 2 to 4. The substrates 2 to 4 are provided at its inside with the patterned conductors. It should be noted that the above electrically insulation distance is one example. Therefore it is possible to determine the electrically insulation distance on the basis of the reference value defined by either the dielectric strength voltage (1) or the dielectric strength voltage (2).

It is noted that the potential difference between the conductors is defined by the potential difference between one end of the patterned conductor 7 and one end of the patterned conductor 9. The potential difference between the conductors is also defined by the potential difference between the interlayer connection member 16 and each the patterned conductor 7, 9. The potential difference between the conductors is defined by the potential difference between the patterned conductor 8 of the substrate 2 and the patterned conductor 10 of the substrate 4 adjacent to the patterned conductor 8.

According to this embodiment, it is necessary to provide a space between one end of the patterned conductor 7 (which has one turn and which is provided on the substrate 1) and one end of the patterned conductor 9 (which has one turn and which is provided on the substrate 3). The space is defined as the electrically insulation distance. Furthermore, the interlayer connection member 16 for the secondary winding is disposed in the space. Consequently, the primary winding (comprising the patterned conductor 7 and the patterned conductor 9) and the secondary winding (comprising the patterned conductor 8 and the patterned conductor 10) share the electrically insulation space. As a result, it is possible to assure the electrically insulation distance between "both ends of the patterned conductor 7 and the patterned conductor 9" and "the interlayer connection member 16". Moreover, it is possible to decrease the electrically insulation region of the substrates 1, 3, compared with the prior art. Consequently, it is possible to achieve the downsizing of the substrate 1, 3. In addition, in this embodiment, there is no need for the secondary winding to make curvature. Therefore, it is possible to improve the inductive coupling between the core member 5 and the secondary winding. Furthermore, the primary winding has one turn, and is provided on the substrate. Therefore, the primary winding is highly inductively coupled to the core member 5 over an entire length of the core member 5. Therefore, even if the primary winding is made curvature, the inductive coupling is hardly decreased. Therefore, it is possible to highly inductively couple the primary winding with respect to the core member 5. As a result, it is possible to prevent the increase of the resistance of winding member 6. Furthermore, it is also possible to prevent the increase of the leakage inductance of the winding member 6.

The interlayer connection member 16 is disposed in a position of a side of the connection terminals 11 to 13 (in other words, in a position of a connection terminal side of the primary winding). Therefore, each one of the patterned conductor 8 of the substrate 2 and the patterned conductor 10 of the substrate 4 has 3.5 turns. That is, each one of the patterned conductor 8 and the patterned conductor 10 has broken number of 0.5. Therefore, if the number of the substrates 2, 4 is odd, the number of total number of the secondary winding is not equal to integral number. This results in non-uniform magnetic flux, and in increase of the loss of the output. However, in this embodiment, the total number of the substrate 2, 4 is two. Therefore, the number of the total turn of the secondary winding is seven. With this configuration, it is possible to prevent the loss of the output without non-uniform magnetic flux. In addition, it is possible to dispose "the connection terminals 11, 13 defined as the first connection terminal" being opposite of "the connection terminals 14, 15 defined as the second connection terminal" from the insertion hole. Consequently, it is possible to make the electrically insulation distance between "the connection terminals 11, 13" and "the connection terminals 14, 15".

Figure 3:
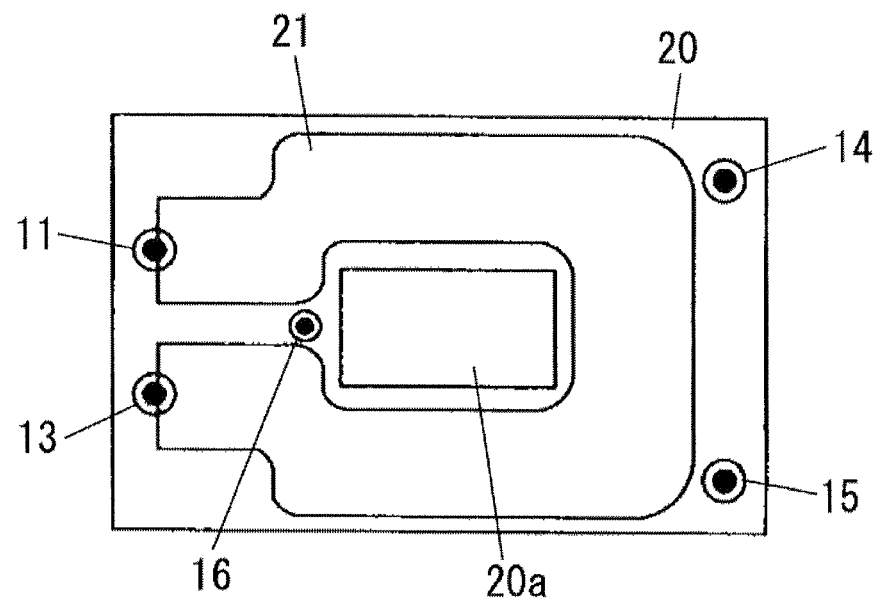
FIG. 3 A shows a front view of the sheet substrate used as the winding member of the above in another embodiment.
Figure 3:
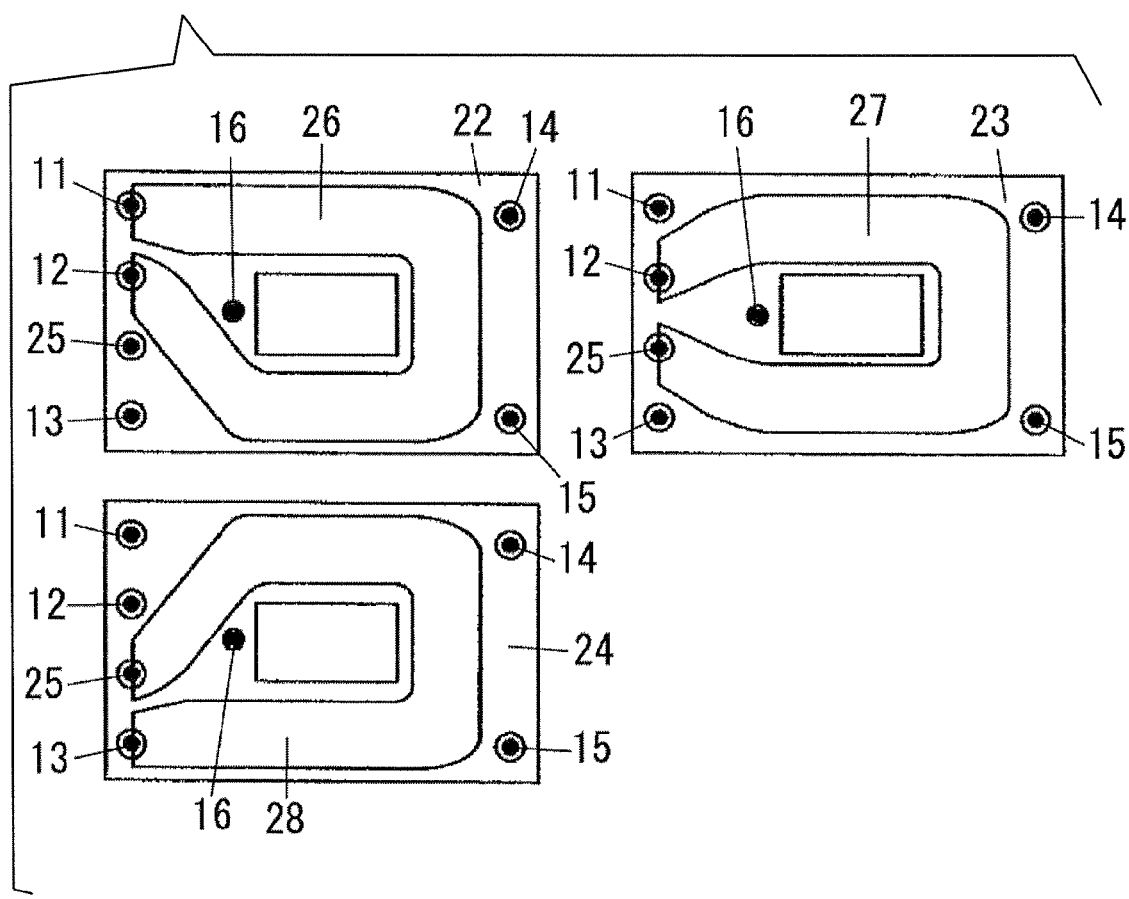

In this embodiment, the substrate 1 is cooperative with the substrate 3 to construct the primary winding having the total turn numbers of two. However, it is possible to employ the substrate 20 shown in FIG. 3 A. That is, it is possible to employ the substrate 20 with the primary winding having the total turn number of one. In addition, it is also possible to employ the substrates 22 to 24 shown in FIG. 3 B. As shown in FIG. 3 B, the substrates 22 to 24 are cooperative with each other to construct the primary winding having the total turn number of three. Also in this case, it is possible to dispose the interlayer connection member in a position which is inwardly of the patterned conductor having one turn, and which is located in one end of the patterned conductor. Consequently, it is possible to decrease the size of the substrate, similar to the above. Furthermore, it is possible to prevent the increase of the resistance of the winding member, and to prevent the increase of the leakage inductance.

In this embodiment, the secondary winding is constructed by the second substrate composed of the substrate 2 and the substrate 4. However, the number of the substrate is not limited thereto. That is, it is only required for the second substrate to include at least two substrates. In addition, it is preferred that the second substrate has the even number of the substrate. In addition, the number of the substrate which constructs the first substrate which constructs the primary winding is not limited to this embodiment. For example, it is possible to employ the first substrate having four substrates. Furthermore, needless to say, the material of the core member 5 is not limited to the ferrite. That is to say, it is only required for the core member 5 to be made of the magnetic material. In addition, each one of the substrate 1 to 4 has a rectangular shape. However, it is possible to employ the substrate 1 to 4 having a shape other than the rectangular shape.

Second Embodiment

The explanation of the transformer in the second embodiment is made with FIG. 5 to FIG. 9. In the first embodiment, the connection terminals 11 to 13 are located in a position opposite of the connection terminals 14, 15 from the insertion hole. However, in this embodiment, the connection terminals 11 to 13 are located in a position of a same side of the connection terminals 14, 15 from the insertion hole. It is noted that the basic components other than the above is in common with the basic components in the first embodiment. Therefore, the explanation of the basic components in common with the components of the first embodiment is omitted.

Figure 5A:
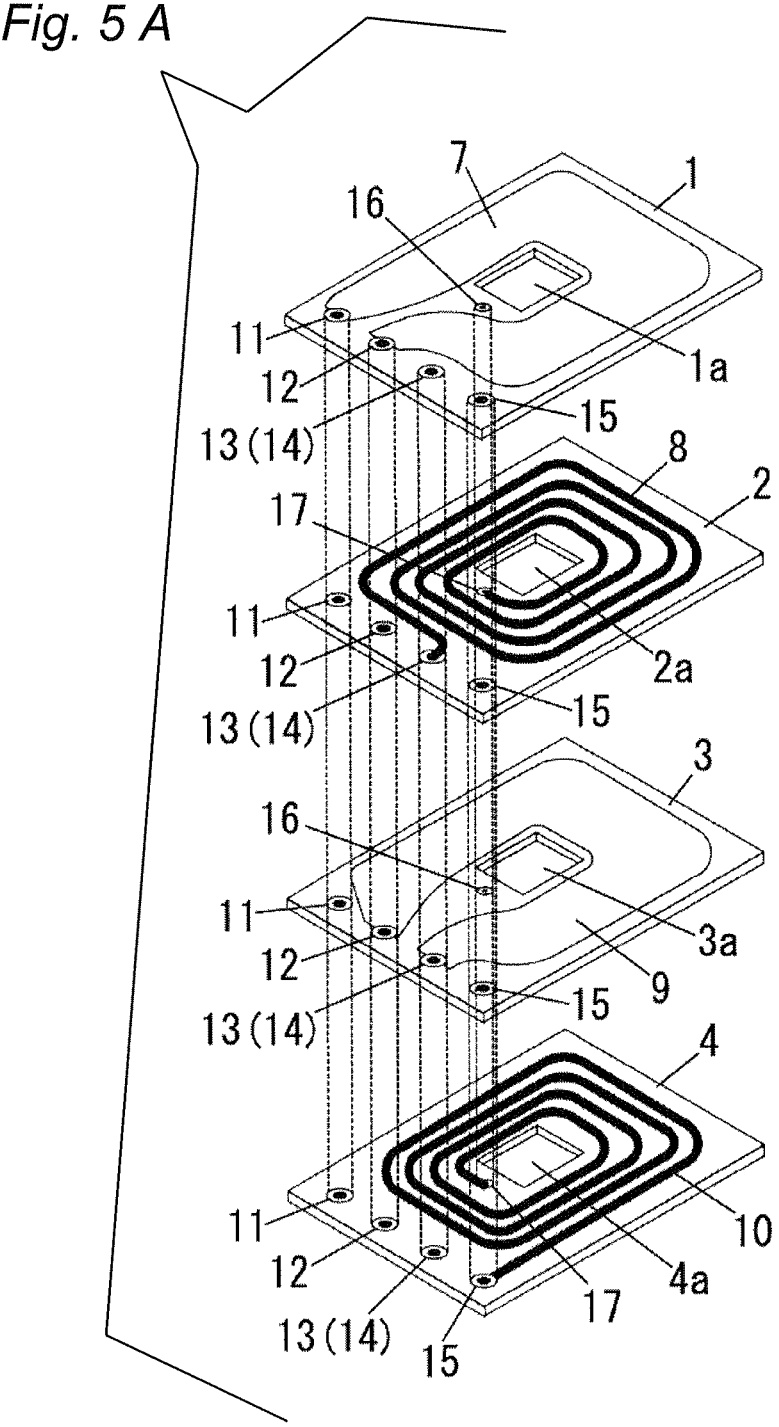
FIG. 5 A shows an exploded perspective view of the transformer in the second embodiment.
Figure 5:
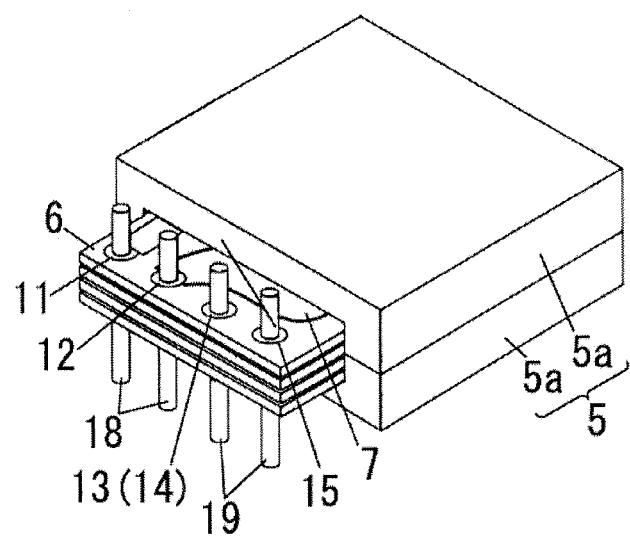

The transformer in this embodiment is shown in FIG. 5. As seen in FIG. 5, the transformer in this embodiment comprises a winding member 6, a core member 5, and connection pins 18, 19. The winding member 6 is constructed by stacking the substrates 1 to 4. The core member 5 is attached to the winding member 6. The connection pins 18, 19 are fixed to the substrate by means of the solder. The connection terminals 11 to 13 are located in positions which are in the same side of the connection terminal 14, 15 from the insertion hole. (The connection terminals 11 to 13 are located in positions which are located in the left side of FIG. 5 A.) Therefore, both the "the patterned conductors 7, 9 which construct the primary winding" and "the patterned conductors 8, 10 which construct the secondary winding" are pulled out to the longitudinal one end of the substrate. In addition, in this embodiment, the connection pin is not attached to one longitudinal end of the substrate opposite to the connection terminals 11 to 15. Therefore, each one of the core member 5 and the substrates 1 to 4 has a length which is designed such that one end of the substrates 1 to 4 opposed to the connection terminals 11 to 15 are not projected outwardly of the core member 5.

Figure 6:
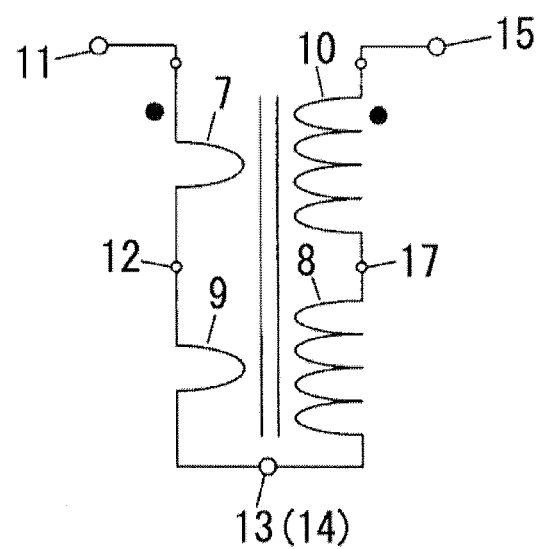
FIG. 6 A shows a circuit diagram of the above.
Figure 6:
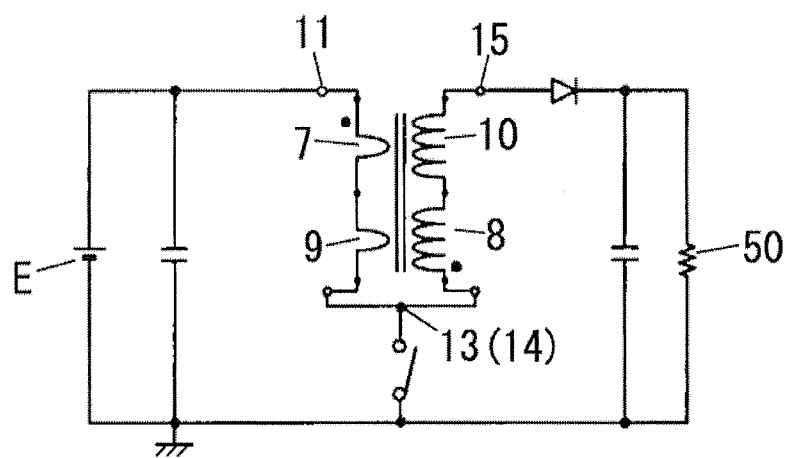

In this embodiment, the connection terminal 13 is located in a position same to the position of the connection terminal 14. Consequently, the transformer in this embodiment discloses, so called, an auto transformer (shown in FIG. 6 A). One end of the primary winding of the auto transformer has an electrical potential which is equal to an electrical potential of one end of the secondary winding. In addition, as shown in FIG. 6 B, the auto transformer is employed to DC-DC converter being configured to supply electrical power to the load 50.

Figure 7:
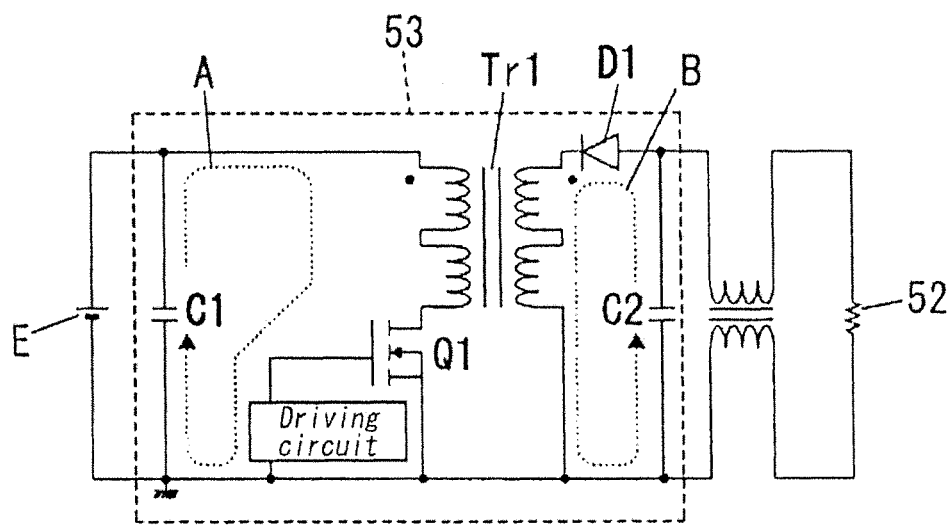
FIG. 7 shows a circuit diagram of the DC-DC converter of the transformer in the first embodiment 1 and the second embodiment 2.
Figure 8:
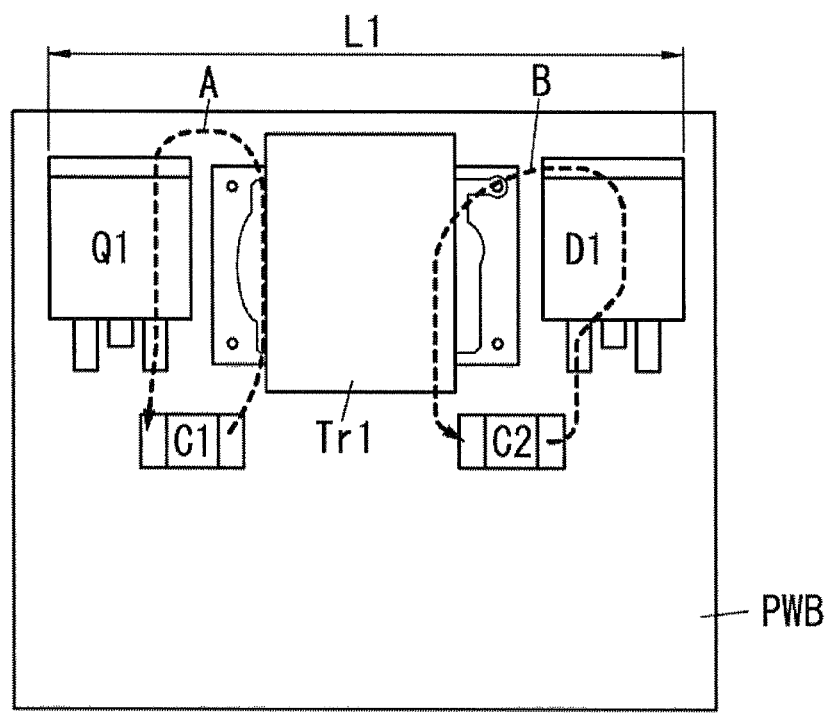
FIG. 8 A shows a mounting example of the DC-DC converter of the transformer in the first embodiment.
Figure 8:
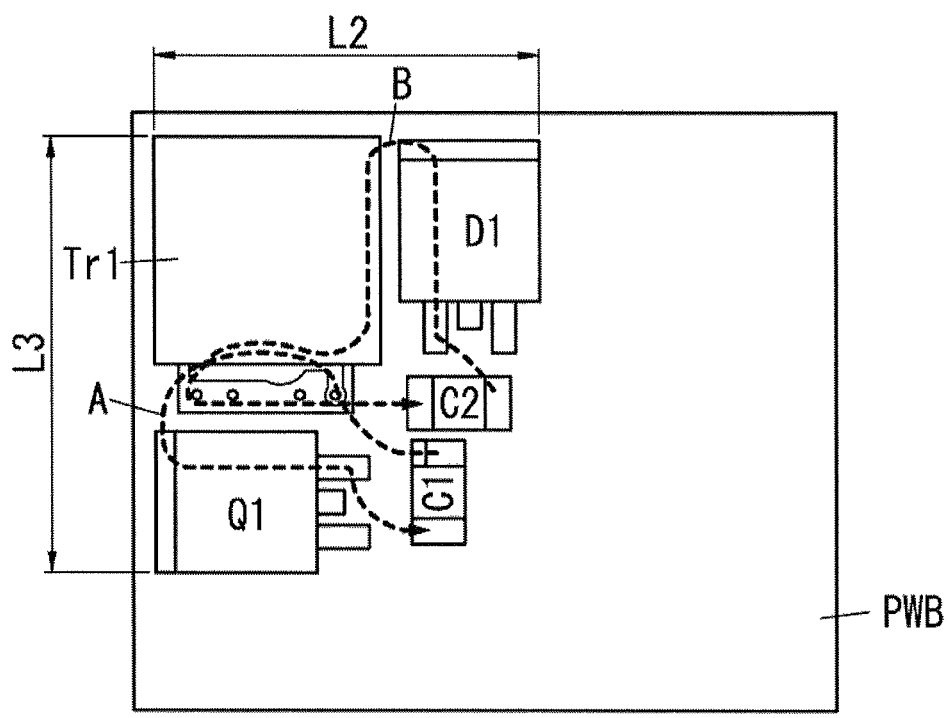

FIG. 7 shows a circuit diagram of the DC-DC converter 53 of flyback type with using the transformer Tr1. FIG. 8 A shows an example of the mounting of the DC-DC converter.

The transformer Tr1, a switching element Q1, and a diode D1 constructing the DC-DC converter 53 are disposed adjacent to each other. This is because in view of the reduction of the loss of the circuit, and in view of the improvement of performance with respect to the noise, generally. In addition, the capacitor C1, a primary side of the transformer Tr1, the switching element Q1, and the capacitor C1 are defined as a path A. It is preferred to employ path A which is thick and short as much as possible. Similarly, the capacitor C2, the diode D1, the secondary side of the transformer Tr1, and the capacitor C2 are defined as a path B. It is preferred to employ the path B which is thick and short as much as possible.

In the transformer Tr1 of the first embodiment, the connection terminals 11, 13 are opposite to the connection terminals 14, 15 from the insertion hole. Therefore, in order to satisfy the above requirement, it is preferred to arrange the switching element Q1, the transformer Tr1, and the diode D1 in a row. The switching element Q1 is opposite of the diode D1 from the transformer Tr1. In this case, it is required for the mother board PWB to have at least one side having a length greater than L1.

In contrast, FIG. 8 B shows an example of mounting the transformer Tr1 in this embodiment. When using the transformer Tr1 in this embodiment, the connection terminals 11, 13 are located in a position in the same side of the connection terminals 14, from the insertion hole. Therefore, it is possible to mount the transformer Tr1 on a corner of the mother board PWB. Consequently, two sides, adjacent to each other, of the mother board PWB have lengths more than L2 or L3. (L2<L1 L3<L1) Therefore, it is possible to decrease the size of the mother board PWB, compared with the first embodiment.

In addition, in the DC-DC converter 53 of the flyback type shown in FIG. 7, the DC-DC converter 53 of the flyback type stores the energy to the transformer Tr1, and supplies the energy to the load 52. However, an amount of the heat generation of the transformer Tr1 is high. Therefore, the transformer Tr1 increases the temperature of the electronic components which are arranged adjacent to the transformer Tr1. However, in this embodiment, the transformer Tr1 is disposed at a corner of the mother board PWB. If the mother board PWB is incorporated into the metal case (which is not shown), it is possible to increase the dimension of the transformer Tr1 which is faced to the wall of the metal case. As a result, the heat generated in the transformer Tr1 is smoothly transferred to the metal case. As a result, it is possible to prevent the impact of the heat to the electronic components.

Moreover, in this embodiment, the connection terminals 11, 13 are disposed in a position in a same side of the connection terminals 14, 15 from the insertion hole. Therefore, there is a space opposite of the connection terminals 11, 13. The space makes it possible to employ the thick patterned conductors 7 to 10. Therefore, it is possible to improve the inductive coupling between the core member 5 and each the winding. In contrast, in a case where the patterned conductors 7 to 10 are not thickened, it is possible to downsize the substrates 1 to 4 by the space.

Figure 9:
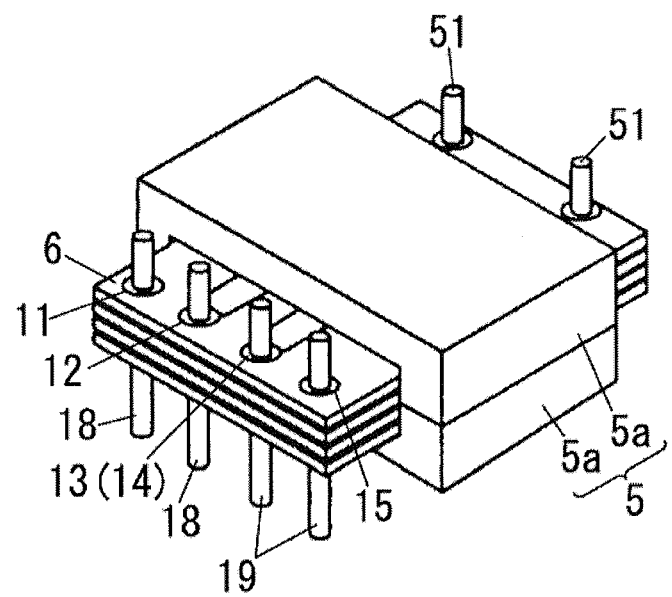
FIG. 9 shows a perspective view of the transformer in another embodiment.

In this embodiment, one ends of the substrates 1 to 4 are provided with the connection terminals 11 to 15. However, in order to uniform the weight balance, as shown in FIG. 9, it is possible to dispose the terminals 51, 51, which are not electrically connected to the patterned conductors 7 to 10, to the other end, opposite to the one ends of the substrates 1 to 4. In addition, this embodiment explains, so called, auto transformer comprising the primary winding having one end and the secondary winding having one end which has the electrical potential which is equal to the electrical potential of the one end of the primary winding. However, it is possible to employ, so called, compound-would transformer comprising a primary winding and a secondary winding which is separate from the primary winding, and which is electrically insulated from the primary winding. It goes without saying that it is only required for the substrate which constructs the secondary winding to comprise at least two substrates. In addition, it is possible to employ the substrate which constructs the primary winding to have one substrate, and more than three substrates.

Third Embodiment

Figure 10:
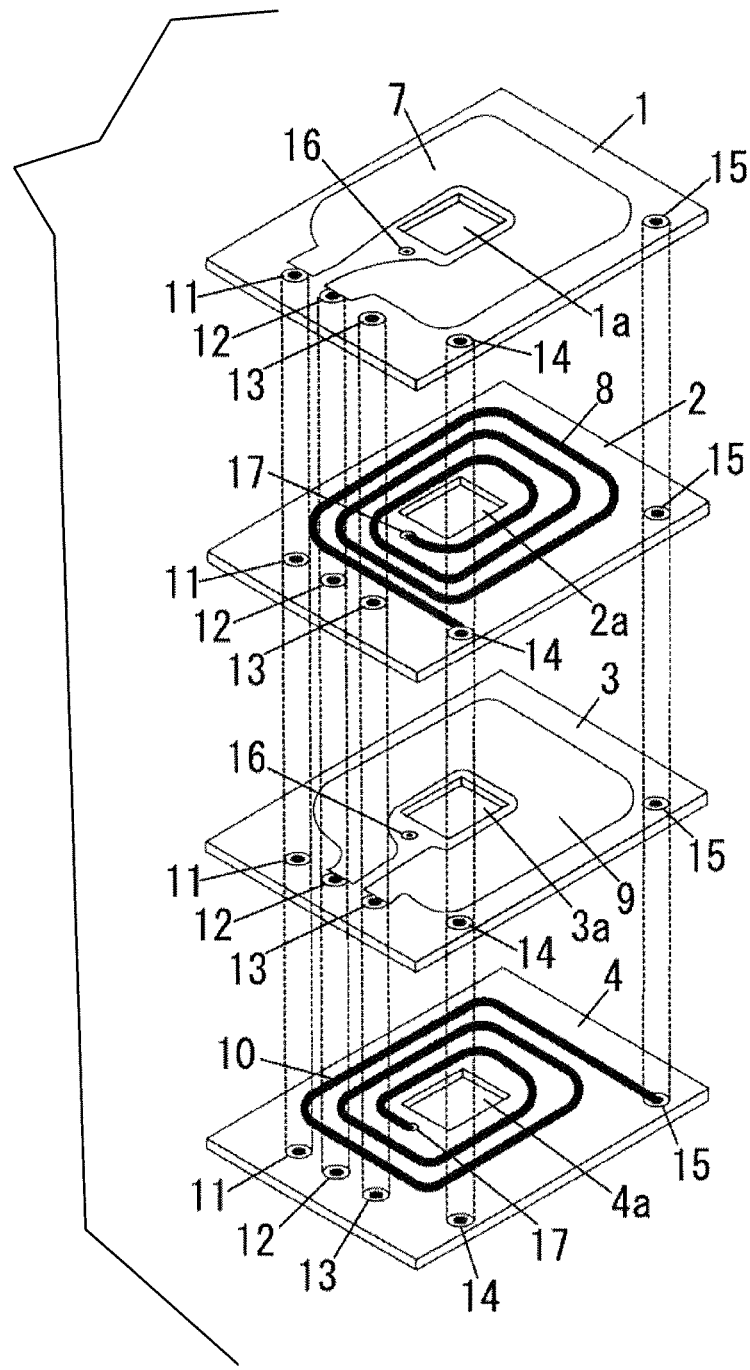
FIG. 10 A shows an exploded perspective view of the winding member of the transformer in the third embodiment.
Figure 10:
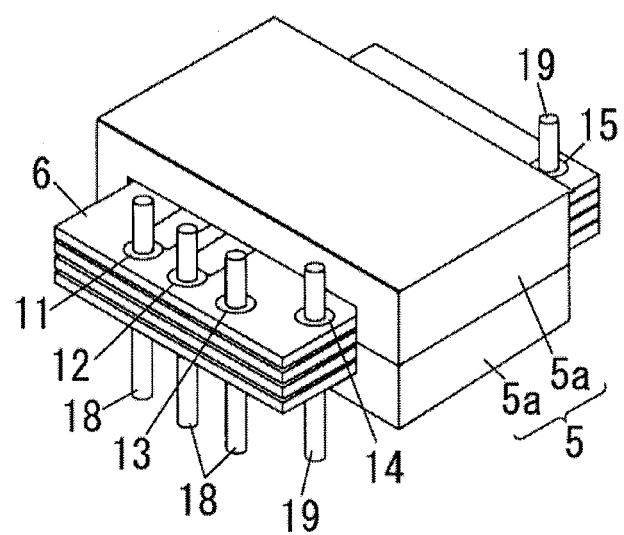
Figure 11:
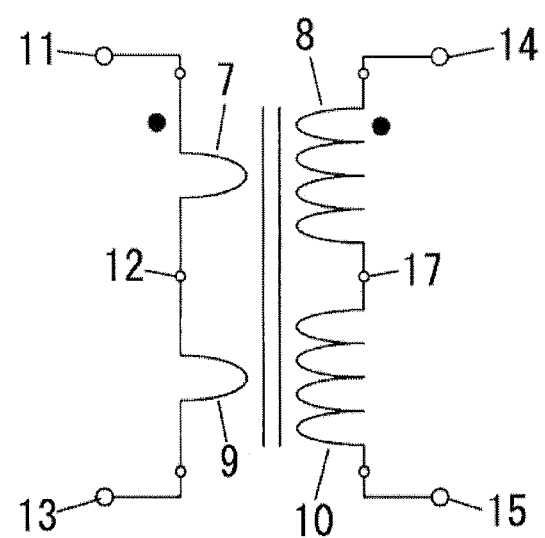
FIG. 11 shows a circuit diagram of the above.

The transformer in the third embodiment is explained with FIG. 10 and FIG. 11. In the first embodiment and the second embodiment, the patterned conductors 7, 9 which construct the primary winding is pulled out to one longitudinal end of the substrate. The patterned conductor 8, 10 which construct the secondary winding is pulled out to one longitudinal end of the substrate. However, in this embodiment, the patterned conductors 7, 9 are pulled out to one longitudinal end of the substrate. The patterned conductor 8, 10 are pulled out to the width end of the substrate. It is noted that the components other than the above is in common with the components in the first embodiment. Therefore, the components in common with the components in the first embodiment are symbolized by the same reference numerals. Therefore, the explanation of the components in common with the components in the first embodiment is omitted.

The transformer in this embodiment, as shown in FIG. 10, comprises the winding member 6, the core member 5, and the connection pin 18, 19. The winding member is constructed by the substrates 1 to 4 which are stacked. The core member 5 is attached to the winding member 6. The connection pins 18, 19 are fixed to the substrates 1 to 4 by the solder. The patterned conductors 7, 9 which construct the primary winding is pulled out to one longitudinal end of the substrate. The patterned conductor 8, 10 which construct the secondary winding is pulled out to one width end of the substrate. That is, in this embodiment, the connection terminals 11, 13 which are connected to both ends of the primary winding are arranged along the width direction of the substrates 1 to 4. The connection terminals 14, 15 which are connected to both ends of the secondary winding is arranged along the longitudinal direction of the substrates 1 to 4. It is noted that FIG. 11 shows a circuit diagram of the transformer in this embodiment.

In the transformer of this embodiment, the connection terminals 11, 13 are arranged along a first side, and the connection terminals 14, 15 are arranged along a second side adjacent to the first side. Therefore, similar to the second embodiment, it is possible to mount the transformer in this embodiment on the corner of the mother board (not shown). As a result, this configuration makes it possible to downsize the mother board.

Furthermore, in the transformer of the second embodiment, the electrical potential between the primary winding and the secondary winding is high, it is required to employ large substrate in order to secure the electrically insulation distance between "the connection terminals 11 to 13" and "the connection terminals 14, 15". In this embodiment, "the connection terminals 11 to 13" are arranged along the first side, and "the connection terminals 14, 15" are arranged along the second side different from the first side. Therefore, it is possible to downsize the substrate, compared with the substrate mounting the transformer in the second embodiment.

Needless to say, also in this embodiment, it is required for the substrate which constructs the secondary winding to have at least two substrates. It is possible to employ the substrate which constructs the primary winding having one substrate or equal to or more than three substrates. Furthermore, the direction of the patterned conductors being pulled out is not limited thereto.

Fourth Embodiment

Figure 12:
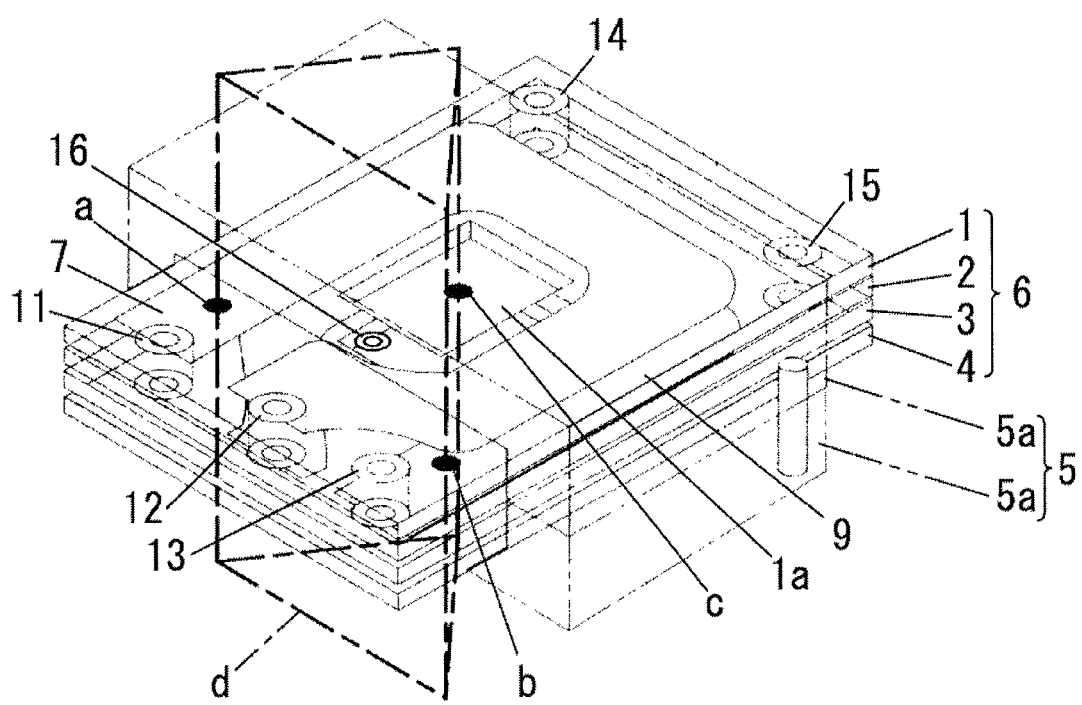
FIG. 12 shows a perspective view of the transformer in the fourth embodiment.
Figure 13:
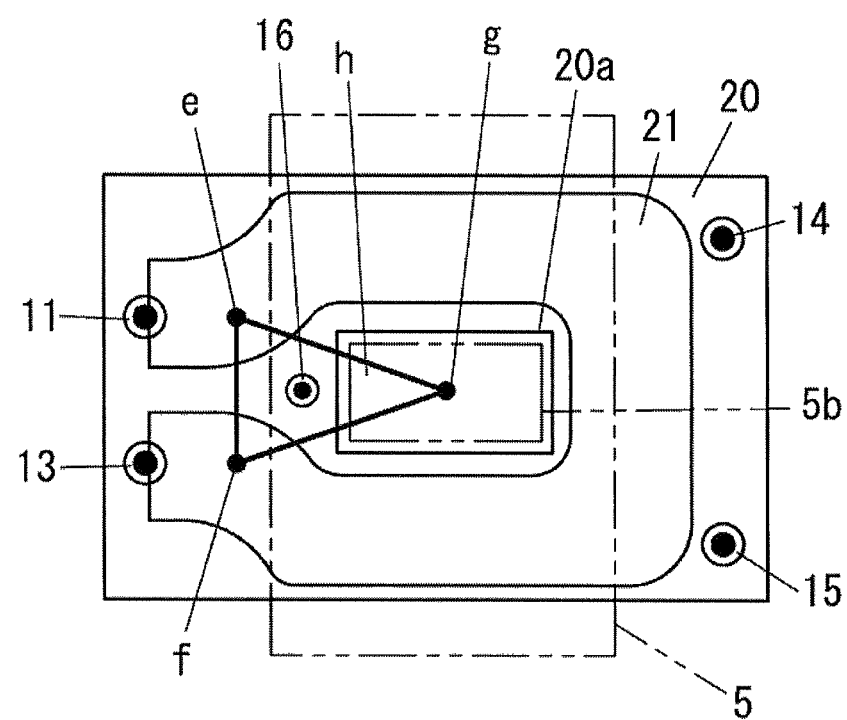
FIG. 13 shows a front view of the transformer in the above.

The transformer in this embodiment is explained with FIG. 12 and FIG. 13. This embodiment is different from the first embodiment, the second embodiment, and the third embodiment in the following features. That is, in this embodiment, the interlayer connection member 16 is disposed within a region or adjacent to a region. The region is surrounded by a first plane passing the first point and a second point, a second plane passing the second point and the third point, and a third plane passing the third point and the first point. The first point is defined as a width center of the first end of the primary winding which is pulled out from the core member 5. The second point is defined as a width center of the second end of the primary winding which is pulled out from the core member 5. The third point is defined as a center of the cross section of the magnetic path of the middle leg portion of the core member 5. It is noted that the components other than the above is in common with the components in the first embodiment. Therefore, the components in common with the first embodiment are symbolized by the same reference numerals. The explanation of the components in common with the first embodiment is omitted.

The transformer in this embodiment shown in FIG. 12 comprises the winding member 6 and the core member 5. The winding member 6 comprises the substrates 1 to 4 which are stacked. The core member 5 comprises a set of cores 5a, 5a. The cores are shaped to have E-shape. When the cores 5a, 5a are combined with the winding member 6 from the upper side and from the lower side, the core member 5 is attached to the winding member 6. Consequently, the transformer is assembled. It is noted that both the longitudinal ends of the substrate is projected outwardly of the core member 5 when the transformer is assembled.

In this embodiment, the interlayer connection member 16 in this embodiment is disposed within the region d which is surrounded by three planes. The three planes extend perpendicular to the substrates 1 to 4. The first plane of the three planes passes through point a and point b. The second plane of the three planes passes through point b and point c. The third plane of the three plane passes through point c and point a. The point a is defined as a first point which is located in the width center of first end of the patterned conductor 7 (a primary winding) which is pulled out from the core member 5. The point b is defined as a second point which is located in a width center of the second end of the patterned conductor (primary winding) which is pulled out from the core member 5. The point c which is located in a center of the cross section of the magnetic path of the middle leg portion (not shown) of the core member 5.

In this case, when the distance between the interlayer connection member 16 and the core member 5 is increased, it is required for the patterned conductor (not shown) of the substrates 2, 4 electrically connected to the interlayer connection member 16 is made curvature. As a result, the inductive coupling between the secondary winding (which is equal to the patterned conductor of the substrates 2, 4) and the core member 5 is decreased. In contrast, with the configuration of this embodiment, the interlayer connection 16 is disposed within the region d. Therefore, it is possible to prevent the curvature of the patterned conductor of the substrate 2, 4. As a result, it is possible to prevent the decrease of the induction coupling between the secondary winding and the core member 5.

FIG. 13 shows a transformer of a modification of this embodiment. The transformer in this embodiment comprises one substrate 20, instead of two substrates 1, 3 shown in FIG. 12. The substrate 20 is provided with an insertion hole 20a, and is provided with a patterned conductor 21 around the insertion hole 20a. The patterned conductor 21 has one turn. The first end of the patterned conductor 21 is connected to the connection terminal 11. The second end of the patterned conductor 21 is connected to the connection terminal 13. That is, in this embodiment, the primary winding (first winding) is constructed by the patterned conductor 21.

The interlayer connection member 16 is disposed within a region h. The region h is surrounded by the three planes each of which is perpendicular to the substrate 20. The first plane of the three plane passes through a point e and a point f. The second plane of the three plane passes through the point f and a point g. The third plane of the three plane passes through the point g and the point e. The point e is defined by a width center of the first end of the patterned conductor 21 which is pulled out from the core member 5. The point f is defined by a width center of the second end of the patterned conductor 21 which is pulled out from the core member 5. The point g is defined by a center of the cross section of the magnetic path of the middle leg portion 5b of the core member 5. Therefore, similar to the above, it this configuration makes it possible to prevent the curvature of the patterned conductor on the substrate which constructs the secondary winding. As a result, this configuration prevents the decrease of the inductive coupling between the secondary winding and the core member 5.

Needless to say, also in this embodiment, it is required for the substrate which constructs the secondary winding to have at least two substrates. It is possible to employ the substrate which constructs the primary winding having "one substrate" or "equal to or more than three substrates".

Fifth Embodiment

Figure 14:
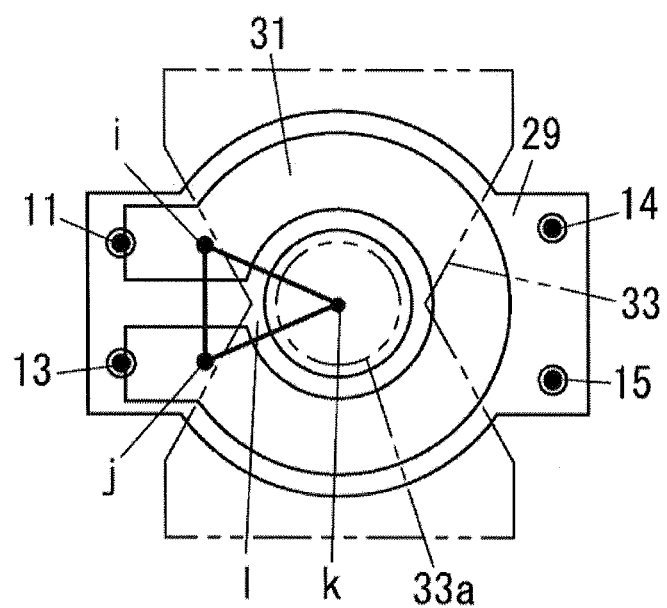
FIG. 14 A shows a front view of the above in another embodiment.
Figure 14:
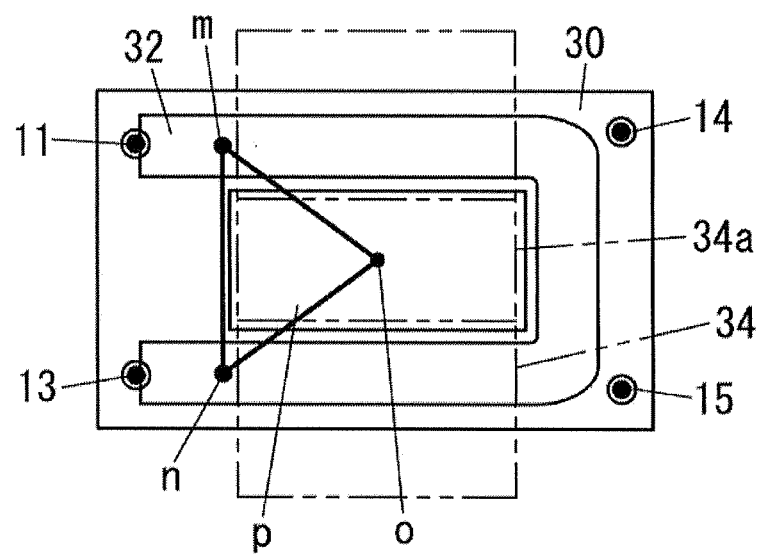
Figure 15:
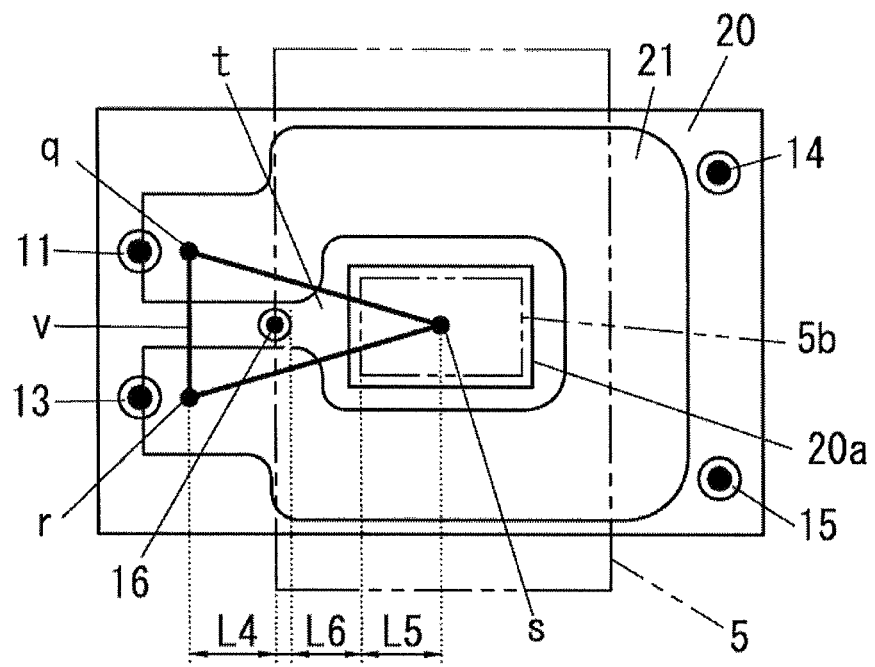
FIG. 15 shows a front view of the transformer of the above.

FIG. 14 and FIG. 15 show the transformer in the fifth embodiment. It is noted that the components are in common with the components of the first embodiment. Therefore, the components in common with the components of the first embodiment are symbolized by the same reference numerals.

Explanations of the components in common with the components of the first embodiment are omitted.

FIG. 14 A shows a transformer employing the core member 33 which has a shape different from the shape of the core member 5 in the first embodiment to the fourth embodiment. FIG. 14 B shows a transformer employing the core member 33 which has a shape different from the shape of the core member 5 in the first embodiment to the fourth embodiment. In the transformer of FIG. 14A, the core member 33 is formed at its middle portion with cutouts, whereby the middle portion of the core member 33 is cut out inwardly. In the transformer in FIG. 14 B, the core is formed to have a width which is approximately equal to a width of the middle leg portion 34a. (In the transformer of FIG. 14 B, the lateral size of the core member 34 is approximately equal to the lateral size of the middle leg portion 34a.)

FIG. 14 A shows the transformer which includes the technical feature of the fourth embodiment. That is, the interlayer connection member (which is not shown) is located within a region l which has an approximately triangle shape which is formed by connecting the point i, point j, and point k. The point i is defined as a width center of the first end of the patterned conductor 31 (the first winding) which is pulled out from the core member 33. The point j is defined as the width center of the second end of the patterned conductor 31 (the first winding) which is pulled out from the core member 33. The point k is defined as a center of the cross section of the magnetic path of the middle leg portion 33a of the core member 33.

FIG. 14 B shows the transformer which includes the technical feature of the fourth embodiment. That is, the interlayer connection member (not shown) is disposed within a region p which has an approximately triangle shape passing the point m, a point n, and a point o. The point m is defined by the width center of the first end of the patterned conductor 32 which is pulled out from the core member 34. The point n is defined by the width center of the second end of the patterned conductor 32 which is pulled out from the core member 34. The point o is defined by the center of the cross section of the magnetic path of the middle leg portion 34a of the core member 34.

However, in these cases, the space for disposing the interlayer connection member is actually very narrow. As a result, an amount of freedom for disposing the interlayer connection member is very low.

In response to this problem, as shown in FIG. 15, the width center of the first end of the patterned conductor 21 which is pulled out from the core member 5 is defined as point q. The width center of the second end of the patterned conductor 21 which is pulled out from the core member 5 is defined as point r. A line connecting the point q and the point r is defined as the line v. Consequently, one end of the core member 5 is spaced from the line v by a distance L4. (The left end of the core member 5 in FIG. 15 is spaced from the line v by the distance L4.) The size of a half of width of the cross section of the magnetic path of the middle leg portion 5b in the lateral direction is defined as the size L5. (The lateral direction is defined by the direction connecting the interlayer connection member 16 and the center of the cross section of the magnetic path of the middle leg portion 5b of the core member 5.) The distance L4 is equal to or more than the size L5. With this configuration, it is possible to dispose the interlayer connection member 16 freely, compared with a case where the distance L4 is equal to or less than the size L5. As a result, it is possible to increase the flexibility of the design of the winding. Furthermore, in this embodiment, the interlayer connection member 16 is disposed within a region t surrounded by the three planes which are perpendicular to the substrate 20.

The first plane of the three planes passes through the point q and the point r. The second plane of the three planes passes through the point r and the point s. The third plane of the three planes passes through the point s and the point q.

There is a case where a distance L6 between "one end of the middle leg portion 5b in the interlayer connection member's side (the right end in FIG. 15)" and "one end of the middle leg portion 5b in the interlayer connection member 16 (the left end in FIG. 15)" is extremely narrow. In this case, there is a possibility of causing the decrease of the productivity of the substrate 20, considering variability of the arrangement of the patterned conductor 21. Also in this case, there is a possibility of causing the insulation breakdown between the interlayer connection member 16 and the patterned conductor 21, considering the variability of the arrangement of the patterned conductor 21. Therefore, it is preferred that the distance between the middle leg portion 5b and the interlayer connection member 16 is equal to or more than 0.5 mm. In addition, it is preferred that the distance between the middle leg portion 5b and the interlayer connection member 16 has a size so as not to increase the external dimension of the substrate 20.

Needless to say, also in this embodiment, it is required for the substrate which constructs the secondary winding to have at least two substrates. It is possible to employ the substrate which constructs the primary winding having "one substrate" or "equal to or more than three substrates".

Sixth Embodiment

Figure 16:
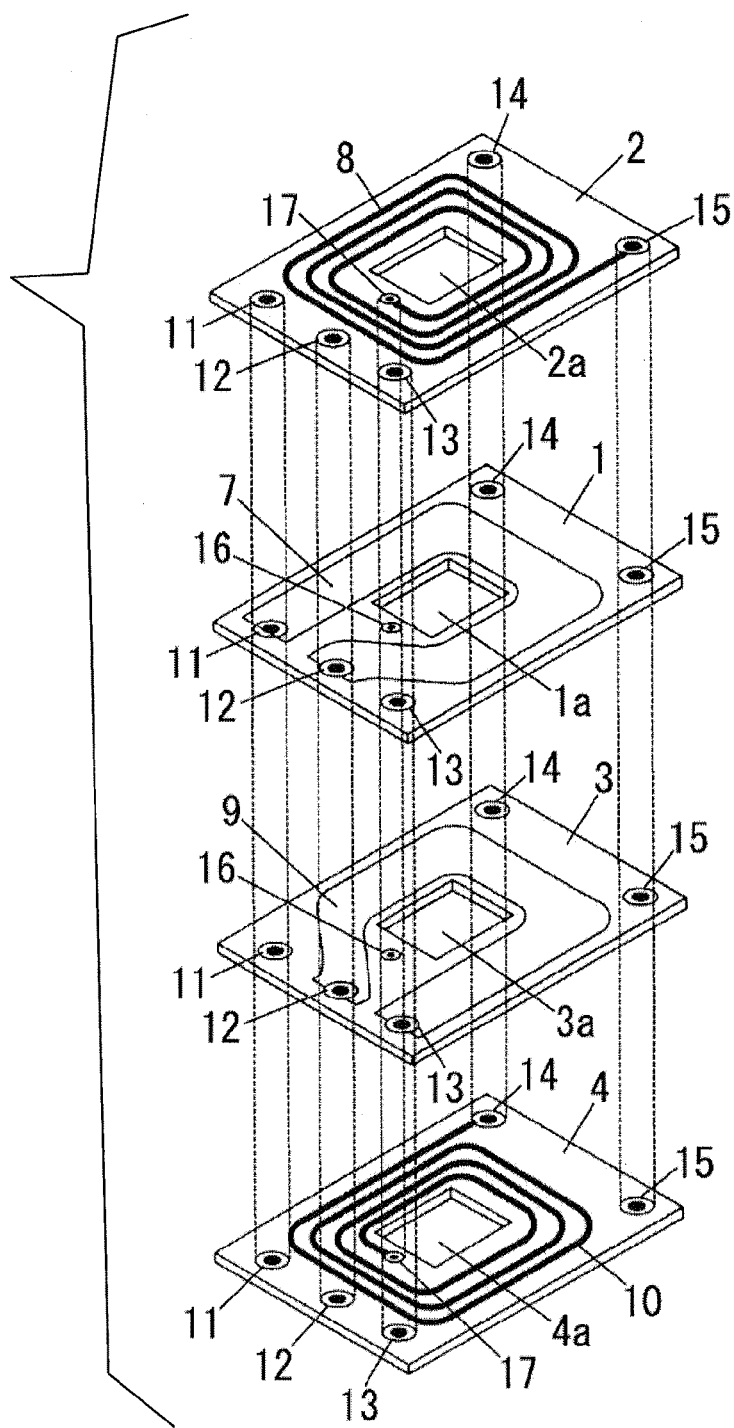
FIG. 16 A shows an exploded perspective view of the winding member of the transformer.
Figure 16:
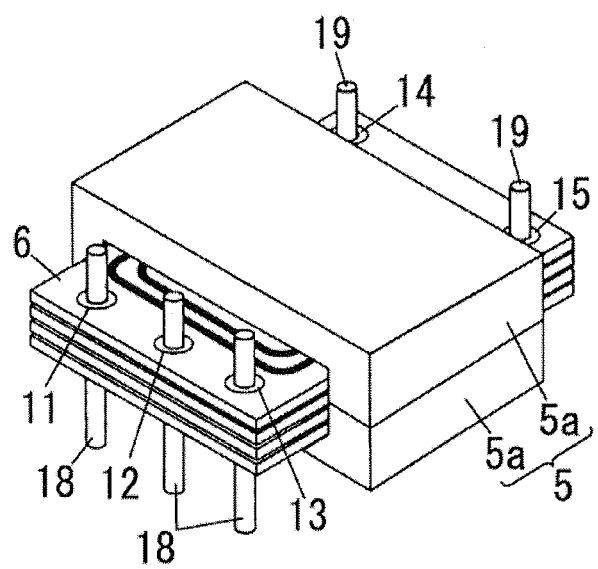
Figure 17:
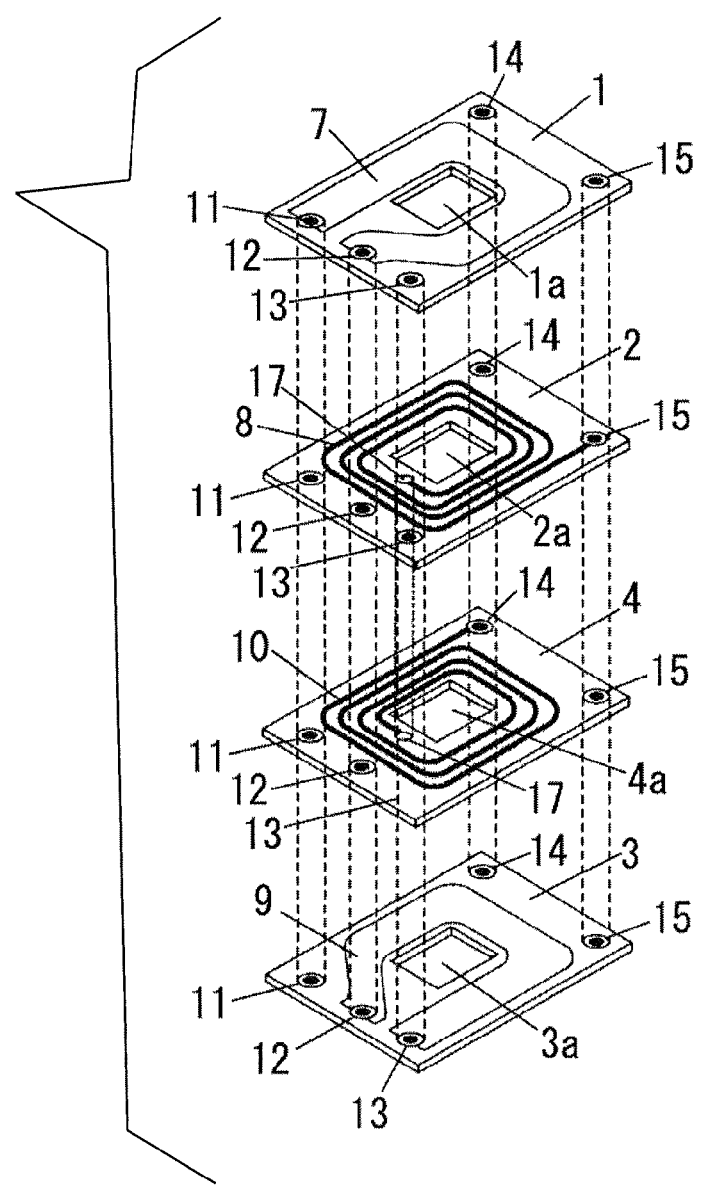
FIG. 17 A shows an exploded perspective view of the winding member of the transformer of the above.
Figure 17:
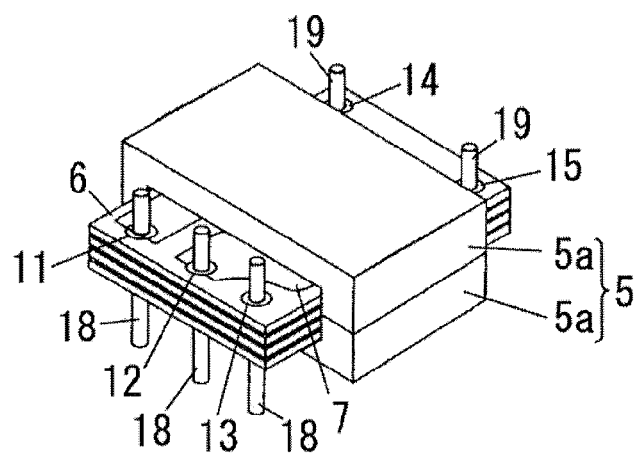
Figure 18:
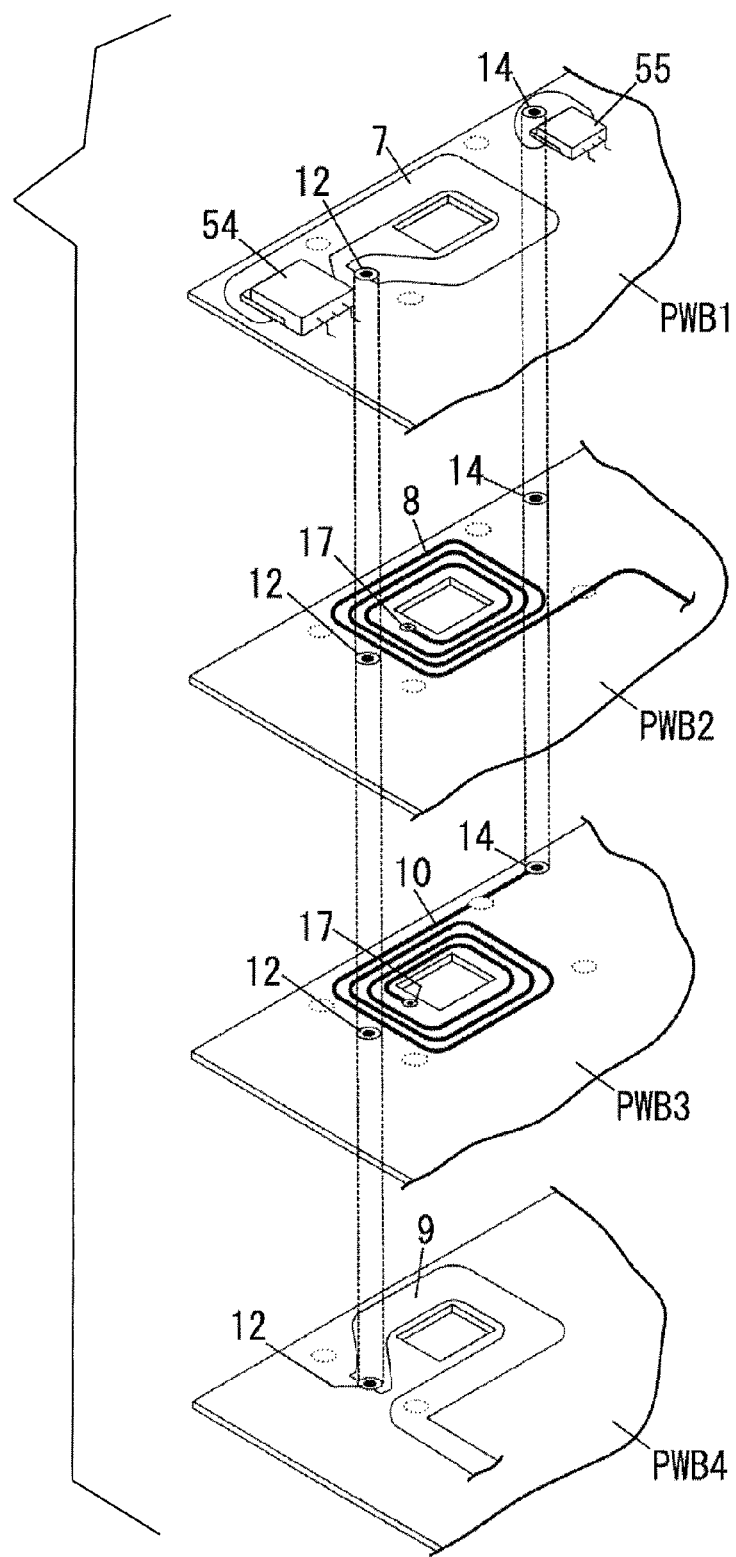
FIG. 18 shows an exploded perspective view of another embodiment.

The transformer in this embodiment is explained with FIG. 16, FIG. 17, and FIG. 18. It is noted that the components are in common with the components of the first embodiment. Therefore, the components in common with the components of the first embodiment are symbolized by the same reference numerals. Explanations of the components in common with the components of the first embodiment are omitted.

In the first embodiment to the fifth embodiment, the substrate 1 which constructs the primary winding is located such that the substrate 1 acts as the surface layer. Therefore, if the electrical potential between the primary winding and the secondary winding is high, there is a requirement of sufficiently securing a creeping distance between the patterned conductor 7 and the interlayer connection member 16. In addition, if the electrical potential between the primary winding and the secondary winding is high, there is a requirement of sufficiently securing a creeping distance between "the patterned conductor 7" and "the connection terminals 14, 15". As a result, there is a possibility that the substrate is required to have a large size.

In view of the above, in this embodiment, as shown in FIG. 16, the substrates 1, 3 which construct the primary winding are employed as inner layers. In addition, an electrically insulation material is filled between the substrate 1 and the substrate 3. Therefore, the electrically insulation material secures the creeping distance. As a result, it is possible to prevent the increase of the size of the substrate.

Furthermore, in the first embodiment to the fifth embodiment, the interlayer connection member for the secondary winding is employed as the surface layer. In order to secure the electrical insulation between the core member 5 and the interlayer connection member 16 having a high electrical potential, there is a need to combine the core member 5 under a condition where the electrically insulation member (not shown) is interposed. This results in the increase of the cost, and in the increase of the size of the transformer.

In view of the above, in this embodiment, as shown in FIG. 17, the interlayer connection member is provided to only the substrates 2 and 4 which is disposed as the inner layer. With the configuration of providing the interlayer connection member 17 to the substrates 2, 4 other than the substrate which is disposed adjacent to the core member 5, it is possible to secure the electrical insulation between each the interlayer connection member 17 and the core member 5. As a result, there is no need to interpose the electrically insulation member between the winding member 6 and the core member 5. Therefore, it is possible to prevent the increase of the cost, and to prevent the increase of the size of the transformer.

Furthermore, FIG. 18 shows an example in a case where a patterned conductor 7 to 10 which construct the primary winding and the secondary winding are provided to the mother boards PWB1 to PWB4 which mounts the electronic components such as semiconductor 54, 55. The mother board PWB2 and the mother board PWB 3 are disposed such that the interlayer connection member 17 is provided to the mother board PWB2 and the mother board PWB3. With this configuration, it is possible to obtain the effect same as the effect in the transformer in FIG. 17. In addition, it is possible to dispose the connection terminal 14 of the secondary winding which is spaced from the patterned conductor 7. Therefore, it is possible to secure the creeping distance between the patterned conductor 7 and the connection terminal 14.

In this embodiment, the connection terminal (which is equal to the connection terminal 15 in the first embodiment) is connected to the electronic components through the patterned wiring on the mother board. Therefore, there is no need to form the through hole, explained in the first embodiment to the fifth embodiment. It is noted that the circuit drawn by the broken line on each the mother boards 1 to 4 indicates the potions of the connection terminals 11, 13 and the connection terminals 14, 15.

Needless to say, also in this embodiment, it is required for the substrate which constructs the secondary winding to have at least two substrates. It is possible to employ the substrate which constructs the primary winding having "one substrate" or "equal to or more than three substrates".

Seventh Embodiment

Figure 19:
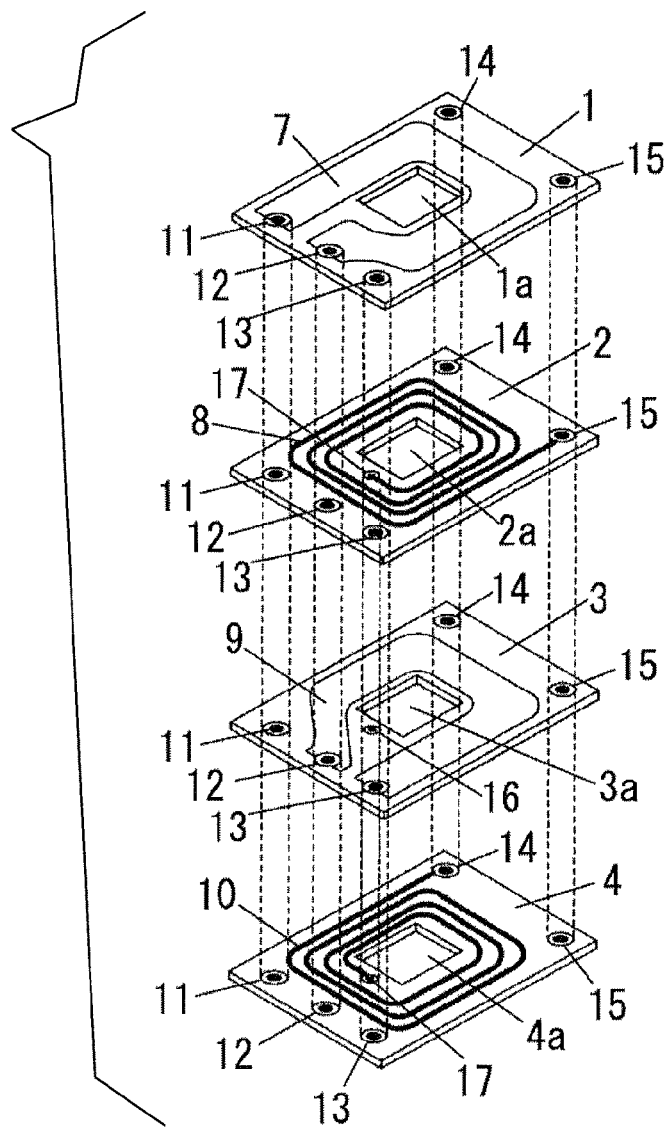
FIG. 19 A shows an exploded perspective view of the winding member of the transformer in the seventh transformer.
Figure 19:
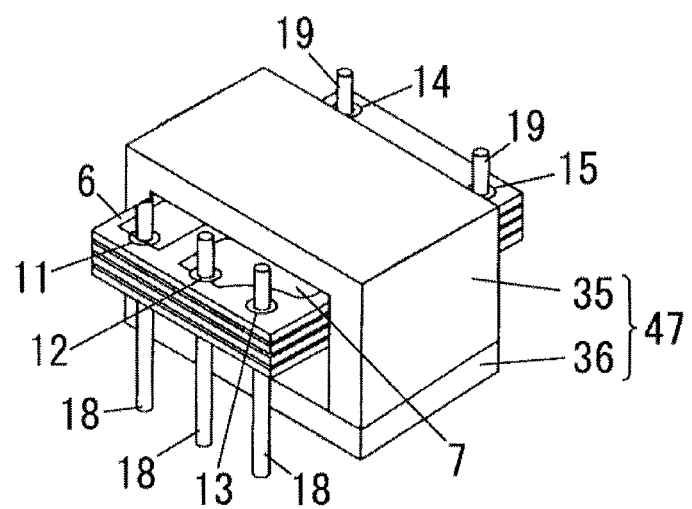
Figure 20:
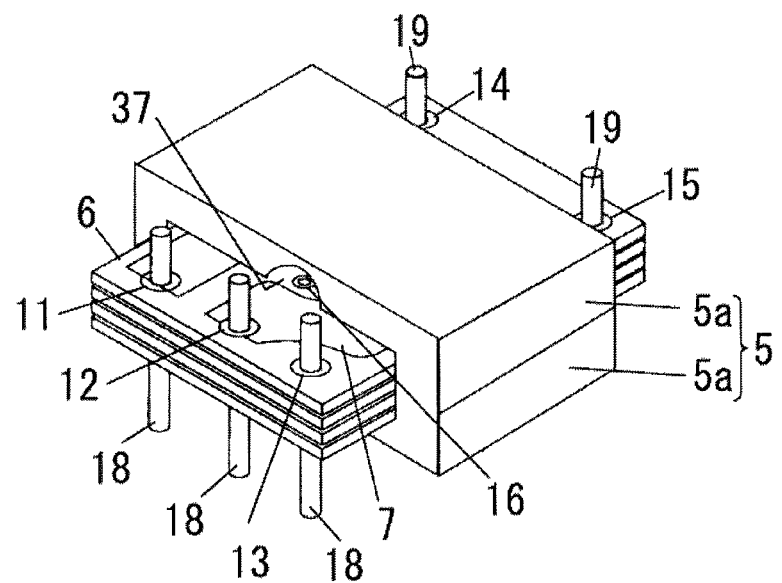
FIG. 20 A shows an explanation illustration explaining the method of forming the insulation distance between the interlayer connection member and the core member of the above.
Figure 20:
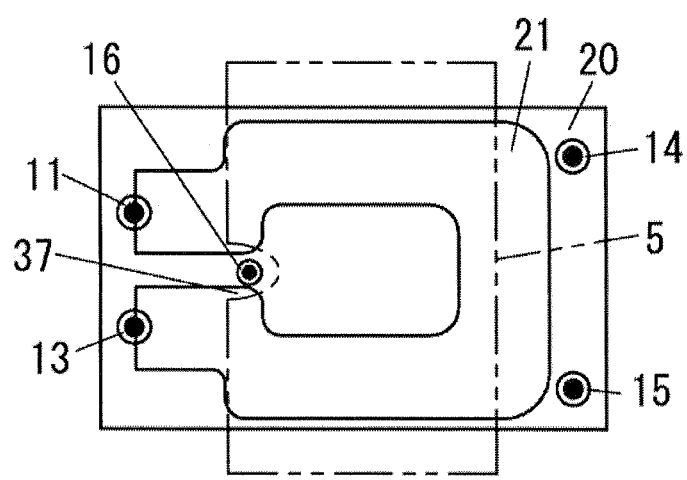
Figure 20:
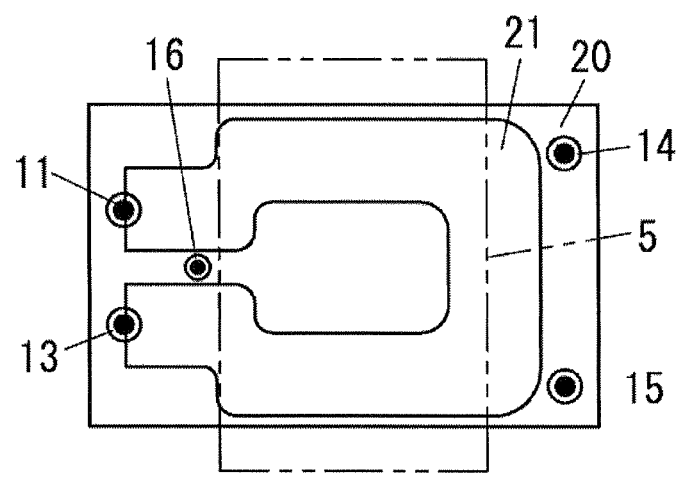

An explanation of the transformer in this embodiment is made with FIG. 19 and FIG. 20. This embodiment is different from the first embodiment to the sixth embodiment in the electrically insulation distance between the interlayer connection member and the core member. It is noted that the components are in common with the components of the first embodiment. Therefore, the components in common with the components of the first embodiment are symbolized by the same reference numerals. Explanations of the components in common with the components of the first embodiment are omitted.

The transformer in this embodiment shown in FIG. 19 comprises a winding member 6, a core member 47, and connection pins 18, 19. The winding member 6 comprises substrates 1 to 4 which are stacked. The core member 47 is attached to the winding member 6. The connection pins 18, 19 are fixed to the substrates 1 to 4 by means of the solder.

The core member 47 comprises a core 35 and a core 36. The core 35 is shaped to have approximately E shape. The core 36 is shaped to have approximately l shape. The core member 47 has a height which is sufficient in a stacking direction of stacking the substrate. (The stacking direction corresponds to the vertical direction of FIG. 19 B.) The core 35 and the core 36 are configured to secure the electrically insulation distance between the core member 47 and the substrate 4 which disposed as a lower layer when the core 35 is combined with the core 36. With this configuration, it is possible to reduce the leakage inductance of the winding member 6.

In this embodiment, the substrates 1, the substrate 2, the substrate 3, and the substrate 4 are stacked in descending order. The substrates 2, 4, which construct the secondary winding, are provided with the interlayer connection member 17. In addition, only the substrate 3 constructing the primary winding is provided with the interlayer connection member 16. That is to say, in this embodiment, the substrate 1 which is nearest to the core member 47 in the stacking direction has no interlayer connection member. In addition, when the substrates 1 to 4 are stacked, the interlayer connection member 16, 17, electrically connects the patterned conductor 8 of the substrate 2 to the patterned conductor 10 of the substrate 4. Consequently, the secondary winding is constructed.

Furthermore, in this embodiment, "only the substrates 2 to 4 which are other than the substrate 1 which is adjacent to the core member 47" are provided with the interlayer connection member 16, 17. (In other words, "only the substrates 2 to 4 which are other than the substrate 1 which is nearest to the core member 47" are provided with the interlayer connection member 16, 17.) Consequently, it is possible to secure the electrically insulation distance between the core member 47 and each the interlayer connection member 16, 17. Therefore, there is no need to interpose the electrically insulation member between the substrate and the core member. This results in prevention of the increase of the cost. In addition, this results in prevention of increase of the size of the transformer.

Next, FIG. 20 shows one example of a method for securing the electrically insulation distance between the core member 5 and the interlayer connection member 16 on the substrate 1 which acts as the surface layer. As will be understood from FIG. 20 A and FIG. 20 B, the core member 5 is disposed such that the core member 5 overlaps with the interlayer connection member 16 in the stacking direction of the substrate. (The stacking direction is equal to a direction perpendicular to a paper of FIG. 20 B.) The core member 5 has a facing portion which is faced to the interlayer connection member 16. The core member 5 is provided at its facing portion with a cutout 37. The cutout 37 secures the electrically insulation distance between the core member 5 and the interlayer connection member 16. Furthermore, in FIG. 20 C, The core member 5 is disposed such that the core member 5 has non-overlapping relation to the interlayer connection member 16 in the stacking direction of the substrate. This configuration makes it possible to secure the electrically insulation distance between the core member 5 and the interlayer connection member 16. It goes without saying that the means of securing the electrically insulation distance between the core member 5 and the interlayer connection member 16 is not limited thereto. Furthermore, needless to say, it is possible to apply this technique to the transformer explained in the first embodiment to the sixth embodiment. Also in this embodiment, it is required for the substrate which constructs the secondary winding to have at least two substrates. It is possible to employ the substrate which constructs the primary winding having "one substrate" or "equal to or more than three substrates".

Eighth Embodiment

Figure 21:
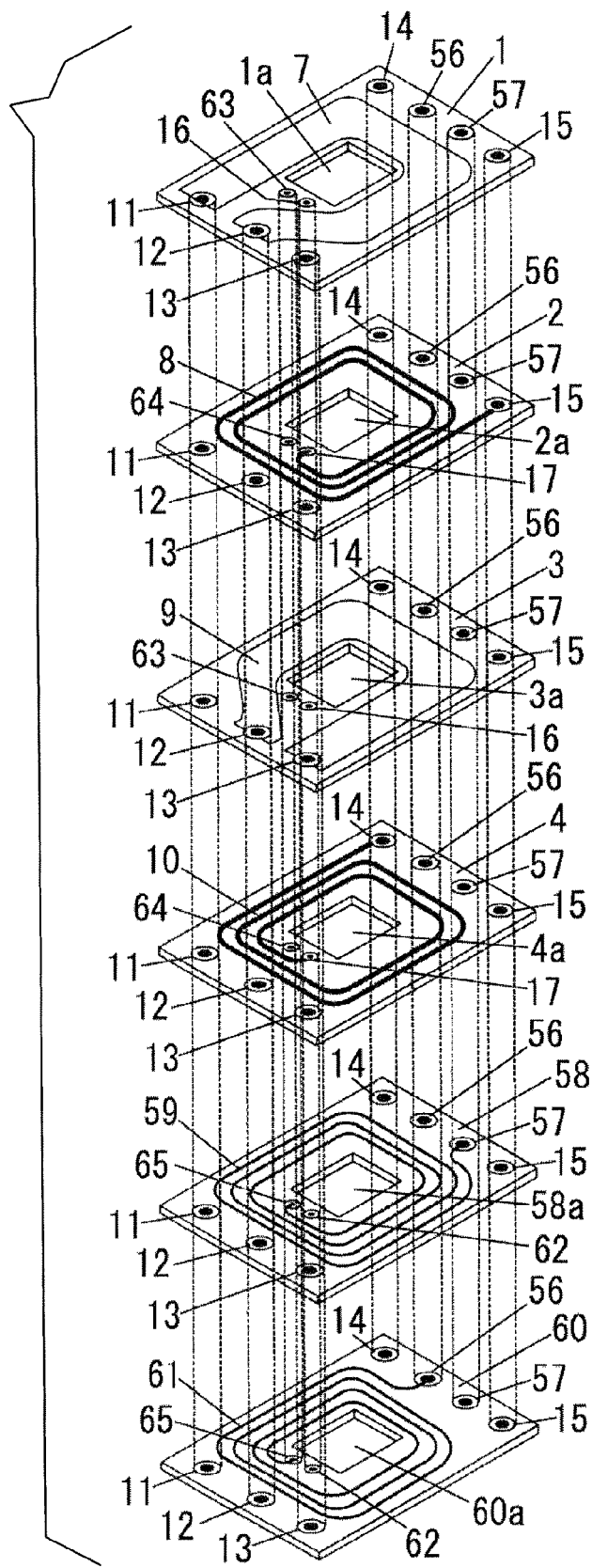
FIG. 21 A shows an exploded perspective view of the winding of the transformer in the eighth embodiment.
Figure 21:
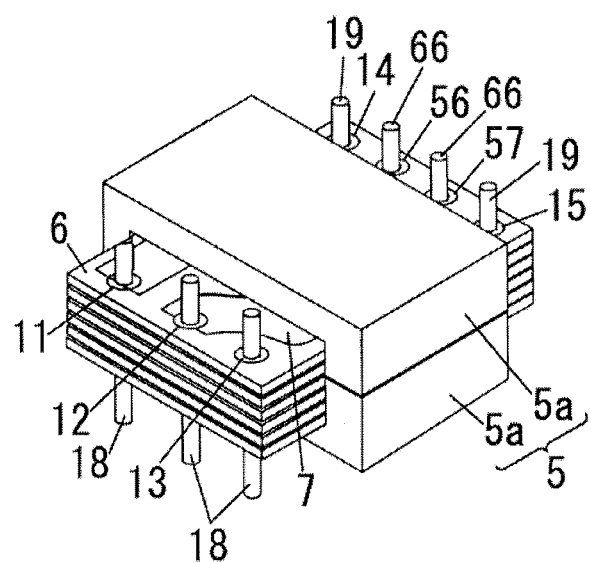
Figure 22:
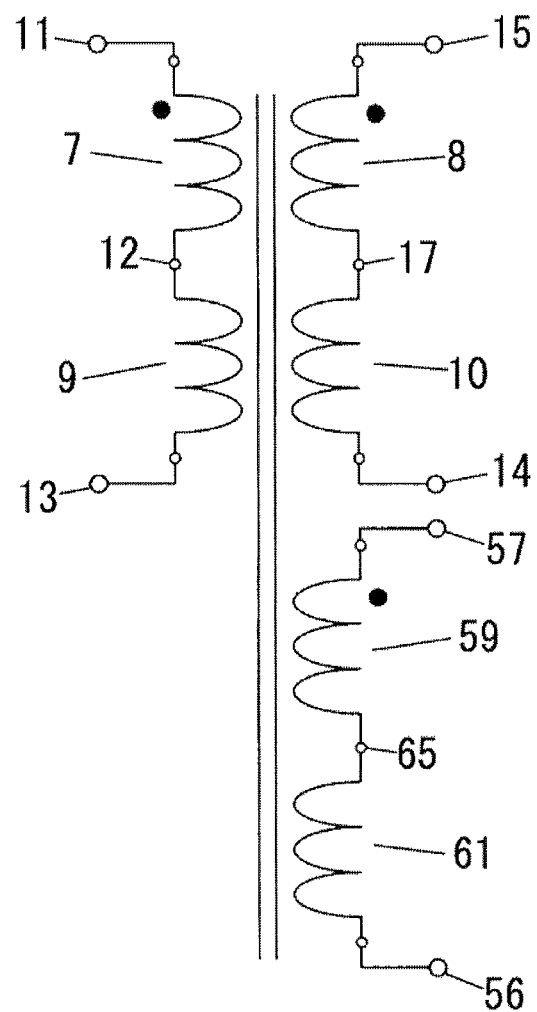
FIG. 22 shows a circuit diagram of the above.
Figure 23:
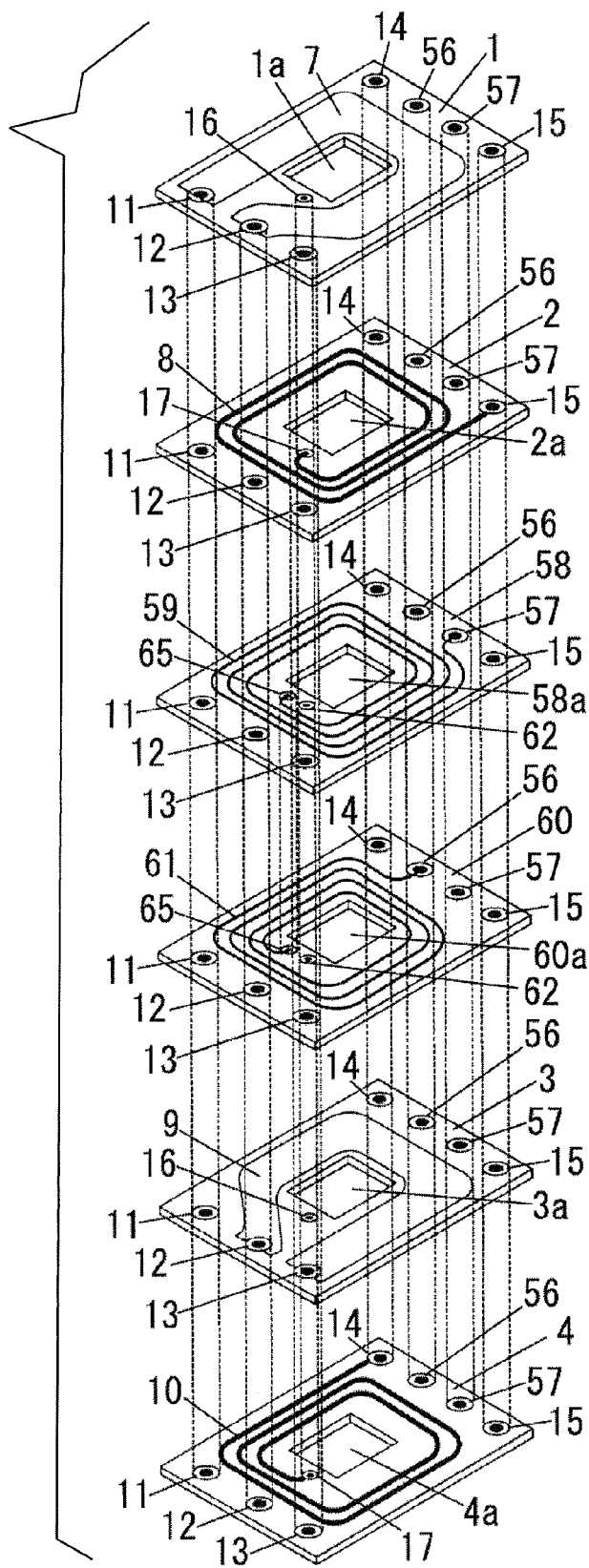
FIG. 23 A shows an exploded perspective view of the winding member of the above.
Figure 23:
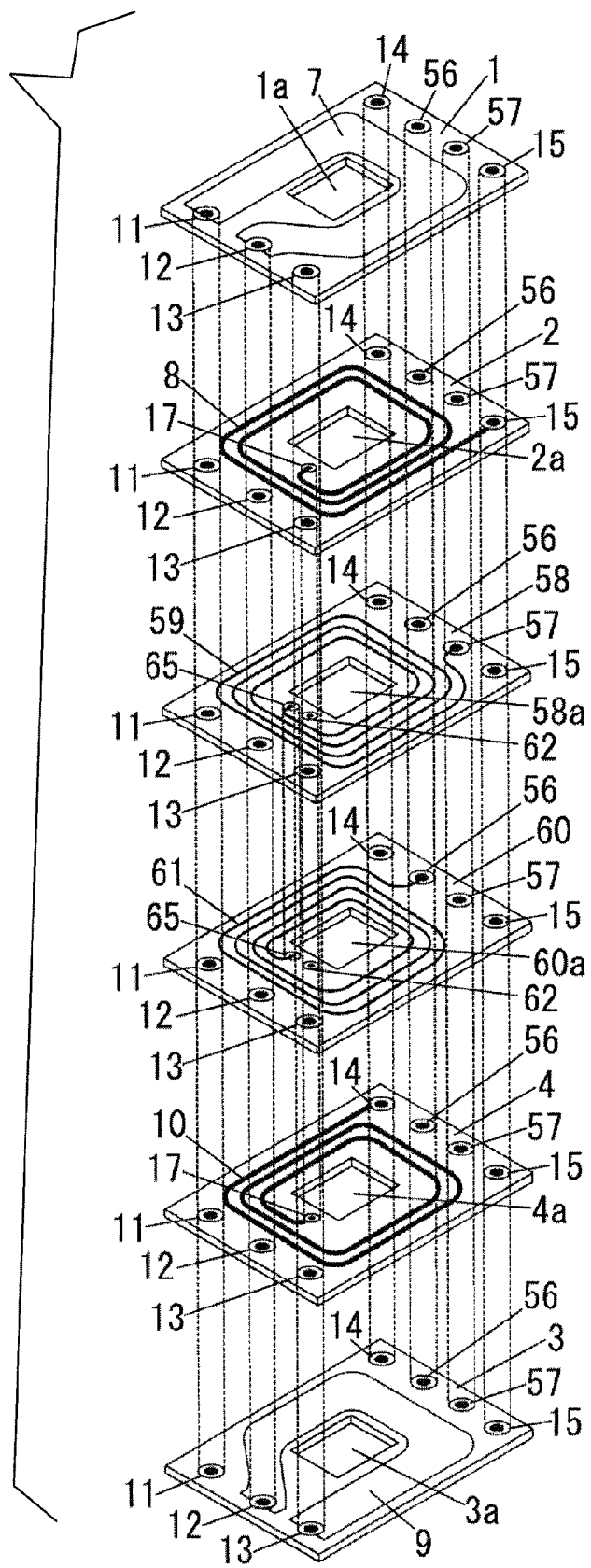

The explanation of the transformer in the eighth embodiment is made with FIG. 21 to FIG. 23. The transformer in the first embodiment to the seventh embodiment comprises the primary winding and the secondary winding. However, the transformer in this embodiment comprises a third winding in addition to the primary winding and the secondary winding. It is noted that the components are in common with the components of the first embodiment. Therefore, the components in common with the components of the first embodiment are symbolized by the same reference numerals. Explanations of the components in common with the components of the first embodiment are omitted.

The transformer in this embodiment comprises the substrates 1, 3, the substrates 2, 4, and the substrates 58, 60. The substrate 1, 3 constructs the primary winding. The substrate 2, 4 constructs the secondary winding. The substrate 58, 60 constructs the third winding. The substrates 1, 2, 3, 4, 58, 60 are stacked, whereby the substrates 1, 3, 4, 58, 60 constructs the winding member 6.

The substrates 1, 3 shown in FIG. 21 A are provided with the interlayer connection member 63. The interlayer connection member 63 is configured to electrically connect the patterned conductor 59 (explained later) to the patterned conductor 61 (explained later) which is cooperative with the patterned conductor 59 to constructs the third winding. In addition, the substrates 2, 4 are provided with the interlayer connection member 64. The interlayer connection member 64 is configured to electrically connect the patterned conductor 59 to the patterned conductor 61. The substrates 1 to 4 are provided with the connection terminals 56, 57. The connection terminals 56, 57 are located between the connection terminal 14 and the connection terminal 15. The connection terminals 56, 57 are connected to ends of the third winding, respectively. In this embodiment, each one of the patterned conductors 8, 10 has 2.5 turns.

The substrate 58 is, as shown in FIG. 21 A, a sheet substrate having a rectangular plate shape. The substrate 58 is shaped to have a dimension approximately equal to the dimension of the substrate 1. The substrate 58 is shaped to have horizontally long shape. The substrate 58 is provided at its center with the insertion hole 58a. The insertion hole 58a is located in a position similar to the position of the insertion hole 1a. The insertion hole 58a is shaped to have a rectangular shape. The insertion hole 58a has a dimension approximately equal to the dimension of the insertion hole 1a. The insertion hole 58a passes through the substrate 58. The substrate 58 is provided with the patterned conductor 59. The patterned conductor 59 surrounds the insertion hole 58a of the substrate 58. The patterned conductor 59 has 3.5 turns. The substrate 58 is provided at its longitudinal one end with a first end, and at its longitudinal the other end with a second end. (The first end corresponds to the left end of FIG. 21 A.) The first end of the substrate 58 is provided with the connection terminals 11 to 13 which are located in positions similar to the substrate 1. The second end of the substrate 58 is provided with the connection terminals 14, 15, 56, 57 which are located in positions similar to the substrate 1.

The substrate 58 is provided with an interlayer connection member 62 which is located at a position corresponding to the interlayer connection members 16, 17. The interlayer connection member 62 is configured to electrically connect the interlayer connection member 16, 17. The substrate 58 is provided with an interlayer connection member 65 which is located at a position corresponding to the interlayer connection member 63, 64. The interlayer connection member 65 is configured to electrically connect the interlayer connection member 63 to the interlayer connection member 64. The patterned conductor 59 has a first end which is connected to the interlayer connection member 65. The patterned conductor 59 surrounds the insertion hole in the counterclockwise direction. The patterned conductor 59 has a second end which is connected to the connection terminal 57.

The substrate 60 shown in FIG. 21 A is shaped to have a dimension approximately equal to the dimension of the substrate 1. The substrate 60 is a sheet substrate to have a rectangular plate shape, whereby the substrate 60 is shaped to have a horizontally long shape. The substrate is provided at its center with an insertion hole 60a having a rectangular shape. The insertion hole passes through the substrate 60. In addition, the substrate 60 is provided with a patterned conductor 61 which surrounds the insertion hole 60a of the substrate 60. The patterned conductor 61 has 3.5 turns. The substrate 60 is provided at its longitudinal one end with a first end, and at its longitudinal the other end with a second end. (The first end of the substrate 60 corresponds to the left end of FIG. 21 A.) The first end of the substrate 60 is provided with connection terminals 11 to 13. The second end of the substrate 60 is provided with the connection terminals 14, 15, 56, 57 which are positioned similar to the substrate 1.

The substrate 60 is provided with an interlayer connection member 62. The interlayer connection member 62 is located in a position corresponding to the interlayer connection members 16, 17. The interlayer connection member 62 is configured to electrically connect the interlayer connection member 16 to the interlayer connection member 17. The substrate 60 is provided with an interlayer connection member 65. The interlayer connection member 65 is located in a position corresponding to the position of the interlayer connection members 63, 64. The interlayer connection member 65 is configured to electrically connect the interlayer connection member 63 to the interlayer connection member 64. The patterned conductor 61 is provided with a first end which is connected to the connection terminal 56. The patterned conductor 61 surrounds the insertion hole 60a in a counterclockwise direction. The patterned conductor 61 is provided with a second end which is connected to the interlayer connection member 65.

In this embodiment, "the substrates 58, 60 which constructs the third winding having highest electrical potential" are arranged in the lowest layer. Therefore, it is possible to reduce the thickness of the electrically insulation material in the stacking direction of the substrate. Consequently, it is possible to obtain the transformer of low profile. It is noted that FIG. 22 shows a circuit diagram of the transformer.

Next, FIG. 23 A shows one example of the transformer having a feature of that (a) the substrates 58, 60 which constructs the third winding is disposed as the inner layer, and (b) interlayer connection member of the third winding is provided to the substrates 58, 60. In this example, the patterned conductor 59, 61 are surrounded by the electrically insulation material so that the electrically insulation material fills the patterned conductor 59, 61. This configuration makes it possible to decrease the electrically insulation distance between the patterned conductor 58 and the primary winding. This configuration makes it possible to decrease the electrically insulation distance between the patterned conductor 61 and the secondary winding. These result in the downsizing of the transformer.

Furthermore, FIG. 23 B shows one example of that "the substrates 2, 4 (secondary winding) and the substrates 58, 60 which requires the interlayer connection member" are disposed as the inner layer. According to this example, it is possible to downsize the transformer, similar to the example shown in FIG. 23 A. Furthermore, it is also possible to prevent the increase of the cost, similar to the transformer shown in FIG. 17.

It is noted that the transformer in this embodiment comprises the three windings which comprises the primary winding, the secondary winding, and the third winding. However, the number of the winding is not limited to this embodiment. That is, it is possible for the transformer to employ equal to or more than four windings. Also in this embodiment, it is required for the substrate which constructs the secondary winding to have at least two substrates. It is possible to employ the substrate which constructs the primary winding having "one substrate" or "equal to or more than three substrates". It is also possible to employ the substrate which constructs the third winding having "one substrate" or "equal to or more than three substrates".

Ninth Embodiment

Figure 24:
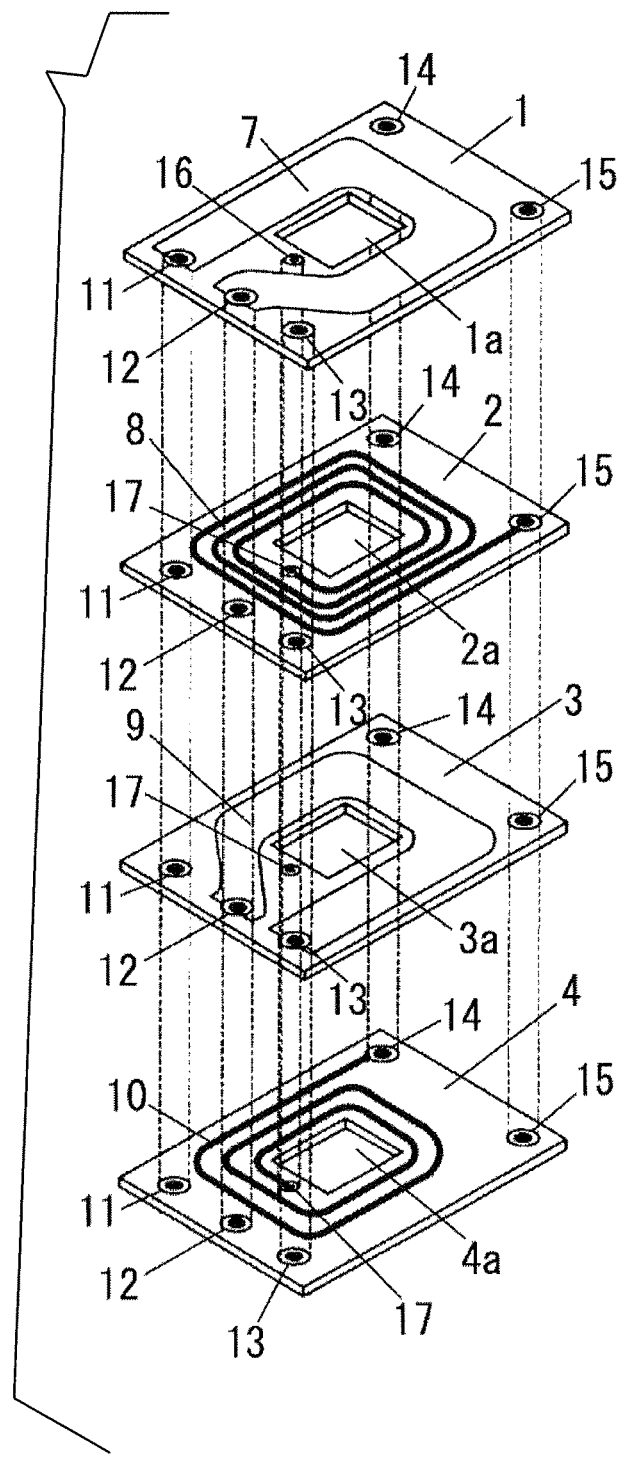
FIG. 24 A shows an exploded perspective view of the winding of the transformer of the ninth embodiment.
Figure 24:
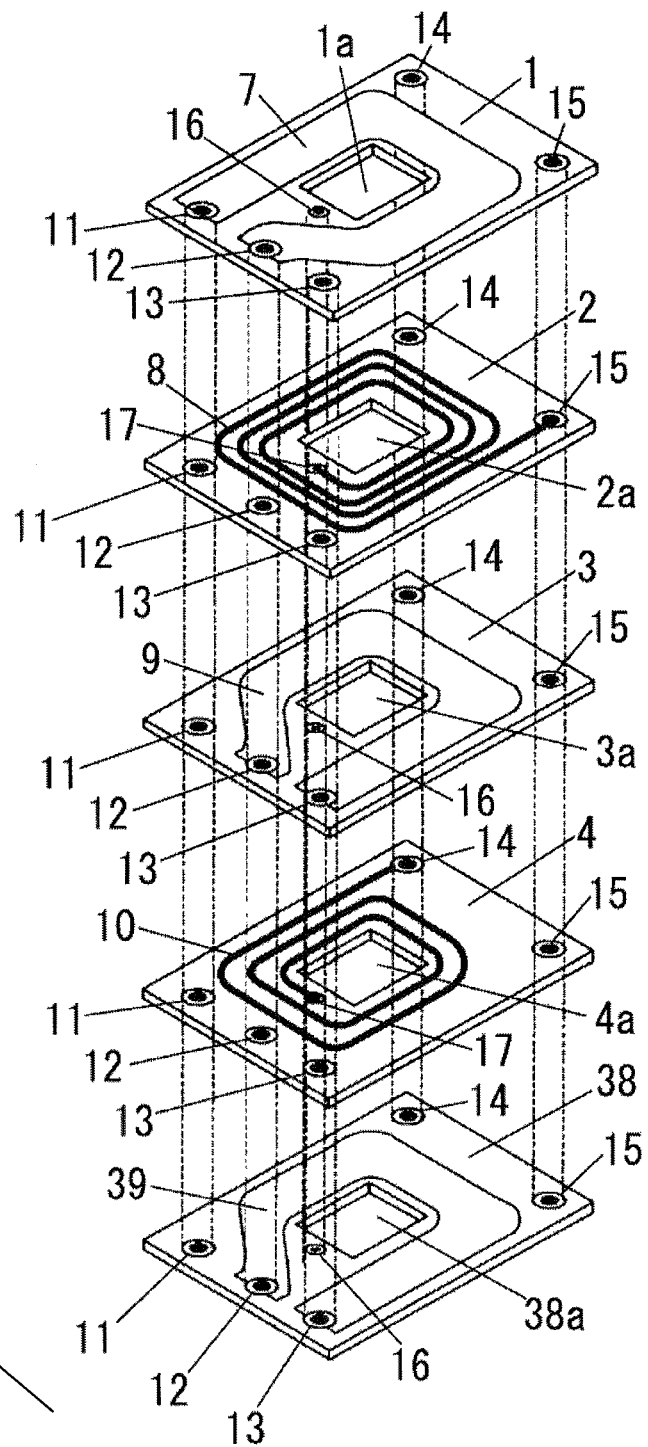

The transformer in this embodiment is explained with FIG. 24. In the first embodiment to the eighth embodiment, the secondary winding is constructed by a plurality of the substrates with patterned conductors, respectively. The patterned conductors of the substrates defining the secondary winding have the numbers of turn which is equal to each other. In contrast, in this embodiment, the secondary winding is constructed by the substrates which include a plurality kind of the substrates in turns. (The secondary winding is constructed by the substrates which includes two kinds of the substrates in turns.) It is noted that the components are in common with the components of the first embodiment. Therefore, the components in common with the components of the first embodiment are symbolized by the same reference numerals. Explanations of the components in common with the components of the first embodiment are omitted.

As will be understood from FIG. 24 A, the transformer in this embodiment comprises a substrate 2 and a substrate 4 which is cooperative with the substrate 2 to construct the secondary winding. The substrate 2 is provided with a patterned conductor 8 which has 3.5 turns. The substrate 4 is provided with a patterned conductor 10 which has 2.5 turn. The substrate 2 having a most number of the turn is disposed between the substrate 1 and the substrate 3 which construct the primary winding. In this case, the total number of turn of the secondary winding is six. Therefore, the transformer with this configuration is configured to generate the uniform magnetic flux, similar to the transformer in the first embodiment to the eighth embodiment. In addition, this configuration makes it possible to prevent the loss of the output.

In addition, in this embodiment, the substrate 2 having the most number of turn is interposed between the substrate 1 and the substrate 3. Therefore, it is possible to improve the inductive coupling between the primary winding and the secondary winding, compared with the case where the substrate 4 having the low number of the turns is interposed between the substrate 1 and the substrate 3.

Next, FIG. 24 B shows another embodiment. The substrate 1 is cooperative with the substrate 3 and the substrate 38 to construct the primary winding. The substrate 2 is interposed between the substrate 1 and the substrate 3. The substrate 4 is interposed between the substrate 3 and the substrate 38. In this case, all the substrates 2, 4 which construct the secondary winding is disposed in spaced between the substrates 1, 3, and 38 which construct the primary winding. Therefore, this configuration makes it possible to improve the coupling between the primary winding and the secondary winding, compared with the case in FIG. 24 A.

Needless to say, also in this embodiment, it is required for the substrate which constructs the secondary winding to have at least two substrates. It is possible to employ the substrate which constructs the primary winding having "one substrate" or "equal to or more than four substrates".

Tenth Embodiment

Figure 25:
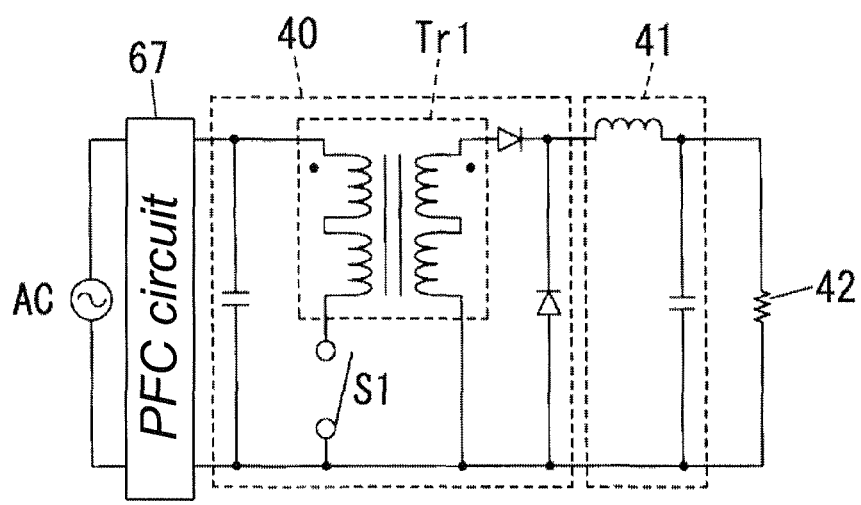
FIG. 25 A shows a circuit diagram of the power converter in the tenth embodiment.
Figure 25:
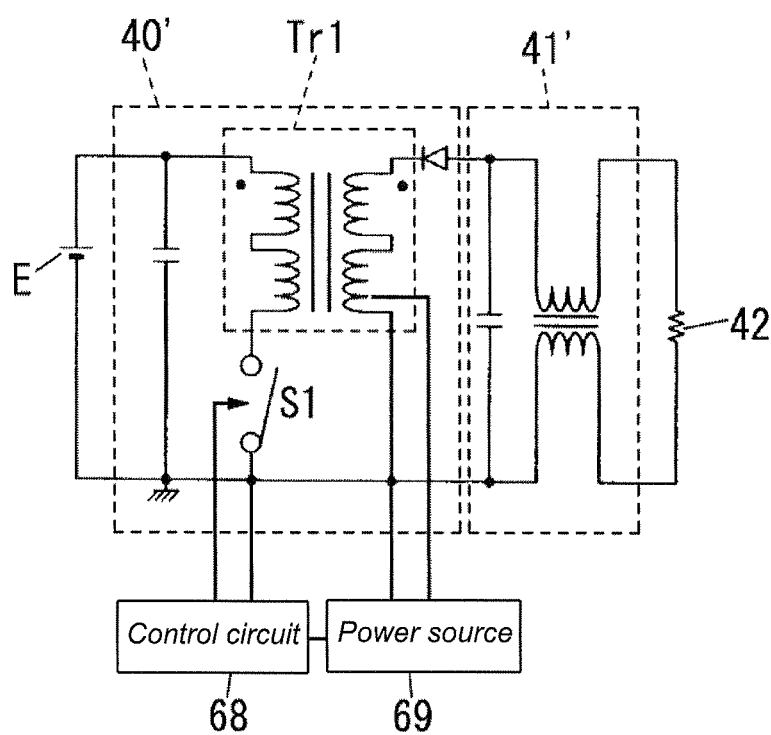

This embodiment explains the power converter on the basis of FIG. 25. The power converter comprises the power conversion circuit using the transformer explained in any one of the first embodiment to the ninth embodiment.

FIG. 25 A shows the power converter in this embodiment. The power converter in this embodiment comprises an AC-DC converter circuit 40 of forward type and an output filter 41. The AC-DC converter circuit 40 comprises the transformer Tr1 shown in the above embodiments. The AC-DC converter circuit 40 is configured to convert the power-supply voltage supplied from an alternating current source into a direct current voltage having a predetermined voltage value. The output filter 41 is connected to the load 42 across output terminals of the output filter 41. In addition, the primary winding of the transformer Tr1 is connected in series with the switching element S1. The switching element S1 is configured to be turned on and turned off in a predetermined cycle by a control circuit which is not shown. In this embodiment, the AC-DC converter circuit 40 is provided with an input terminal which is connected to the PFC circuit 67. The PFC circuit 67 is configured to improve the power factor.

In addition, FIG. 25 B shows another embodiment of the power converter. The power converter comprises a DC-DC converter circuit 40' of flyback type and the output filter 41'. The DC-DC converter circuit 40' comprises the transformer Tr1. The DC-DC converter circuit 40' is configured to convert the power-supply voltage of the direct current power source E into the direct current voltage having a predetermined voltage value. The output filter 41' is connected at its output terminal with the load 42. In addition, the primary winding of the transformer Tr1 is connected in series with the switching element S1. The switching element S1 is configured to be turned on and be turned off by the control circuit 68 in a predetermined cycle. In addition, in this embodiment, the control circuit 68 is provided with electrical power circuit 69 which is configured to generate an operating voltage for activating the control circuit 68. The electrical power circuit 69 is configured to generate the operation voltage from the direct current voltage which is supplied through the patterned conductor which is pulled out from a mid portion of the secondary winding.

When the electrical power is extracted from the mid portion of the winding, the transformer comprising a bobbin, the core, and the winding requires the significant change of the design, and also requires the additional terminal. This results in the increase of the cost, and the increase of the size of the transformer. However, the transformer of sheet type as mentioned above is able to achieve the change of the design by wiring the patterned conductor on the substrate. Therefore, it is possible to prevent the increase of the cost and to prevent the increase of the size of the transformer.

Furthermore, in this embodiment, the transformer in any one of the first embodiment to the ninth embodiment makes it possible to produce the power conversion device having a small size and to prevent the loss of the output. In addition, in a case where the circuit components which construct the power conversion circuit are mounted on the substrate constructing the transformer, it is possible to increase the dimension for radiating the heat. Therefore, it is possible to improve the heat radiation property of the heat generated in the primary winding and the secondary winding.

Needless to say, the usage of the power conversion device is not limited to this embodiment. That is to say, it is exemplified to employ the power conversion device as a device for supplying the lighting voltage to the light source such as an electric-discharge lamp and the LED. In addition, the configuration of the power conversion device is not limited to this embodiment. That is, it is only required for the power conversion device to employ the transformer. Furthermore, in this embodiment, the patterned conductor which is pulled out from the mid portion of the secondary winding is used for generating the electrical power. However, it is possible to use the patterned conductor which is pulled out from the mid portion of the secondary winding for detecting the signal indicative of the operation of the transformer Tr1.

Eleventh Embodiment

Figure 26:
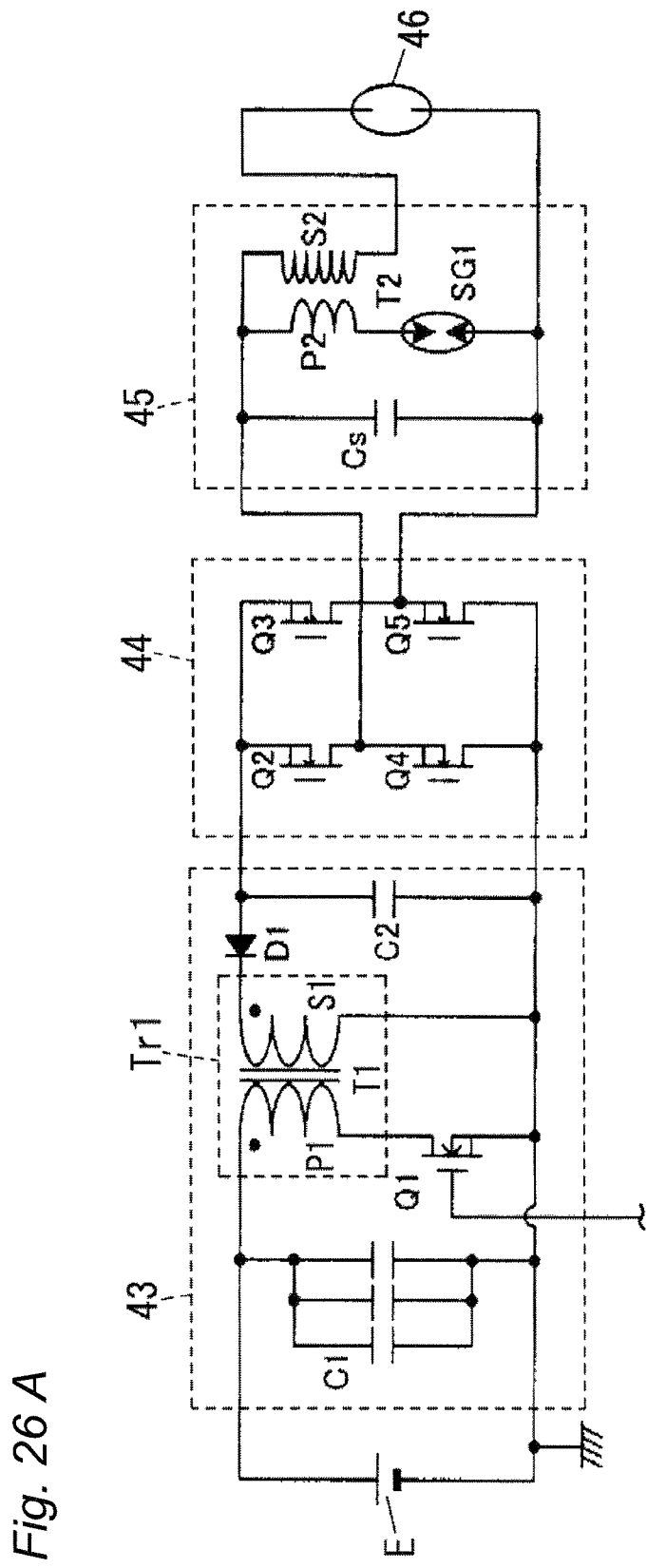
FIG. 26 A shows a circuit diagram of the lighting device.
Figure 26:
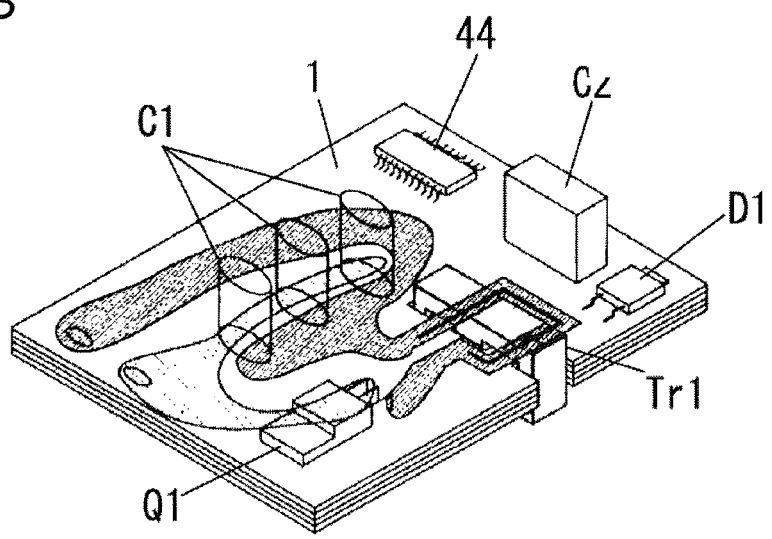
Figure 26:
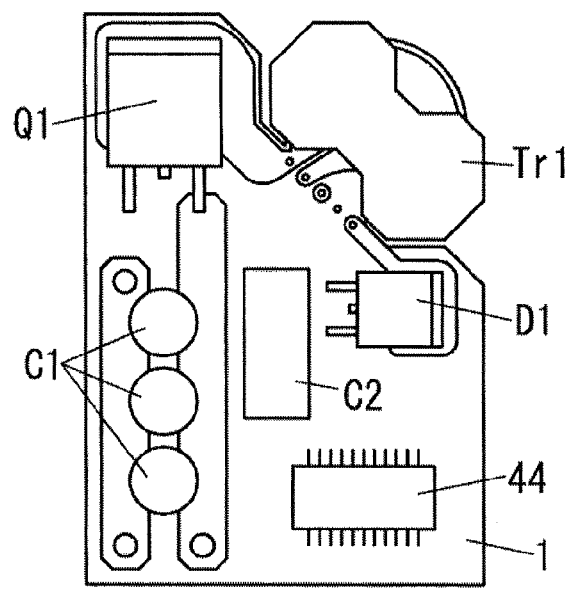
Figure 27:
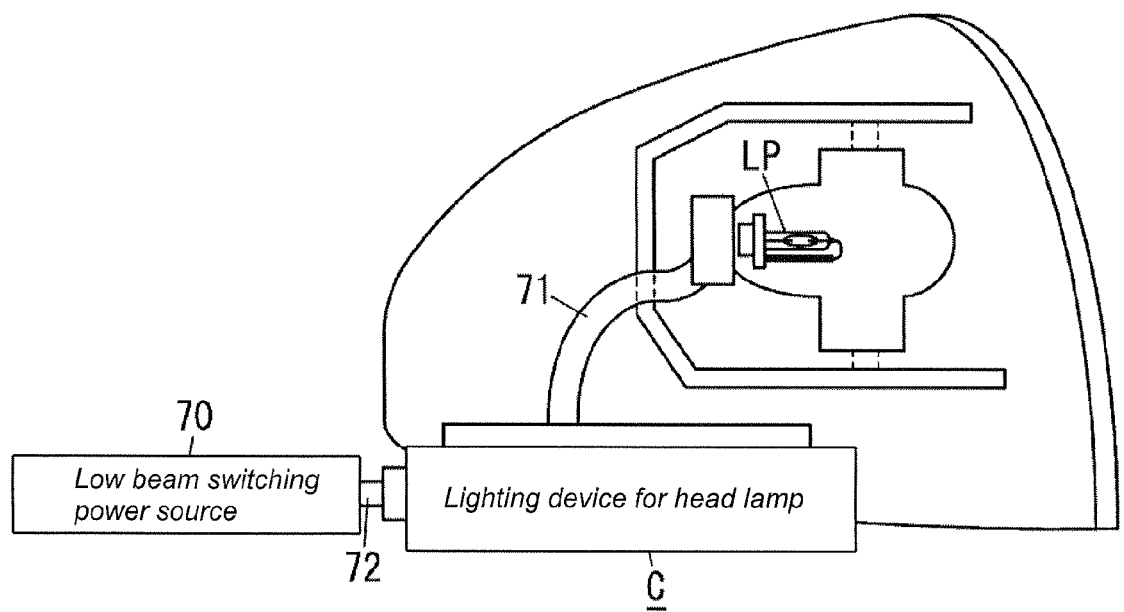
FIG. 27 shows a schematic side view of the lighting device for vehicle.
Figure 28:
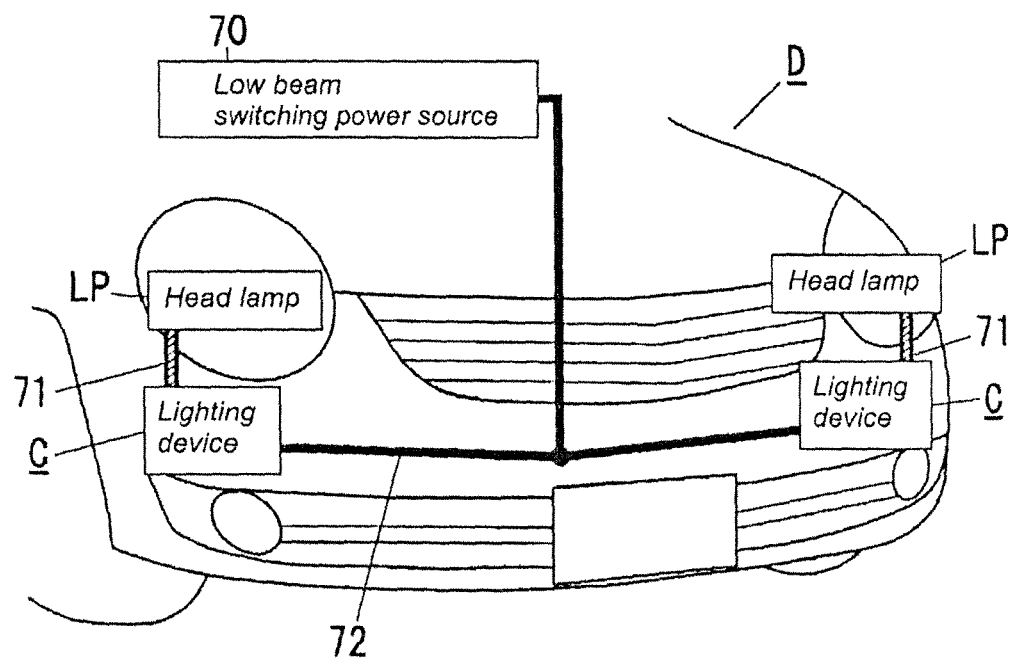
FIG. 28 shows a partial perspective view of the vehicle with the above.
Figure 29:
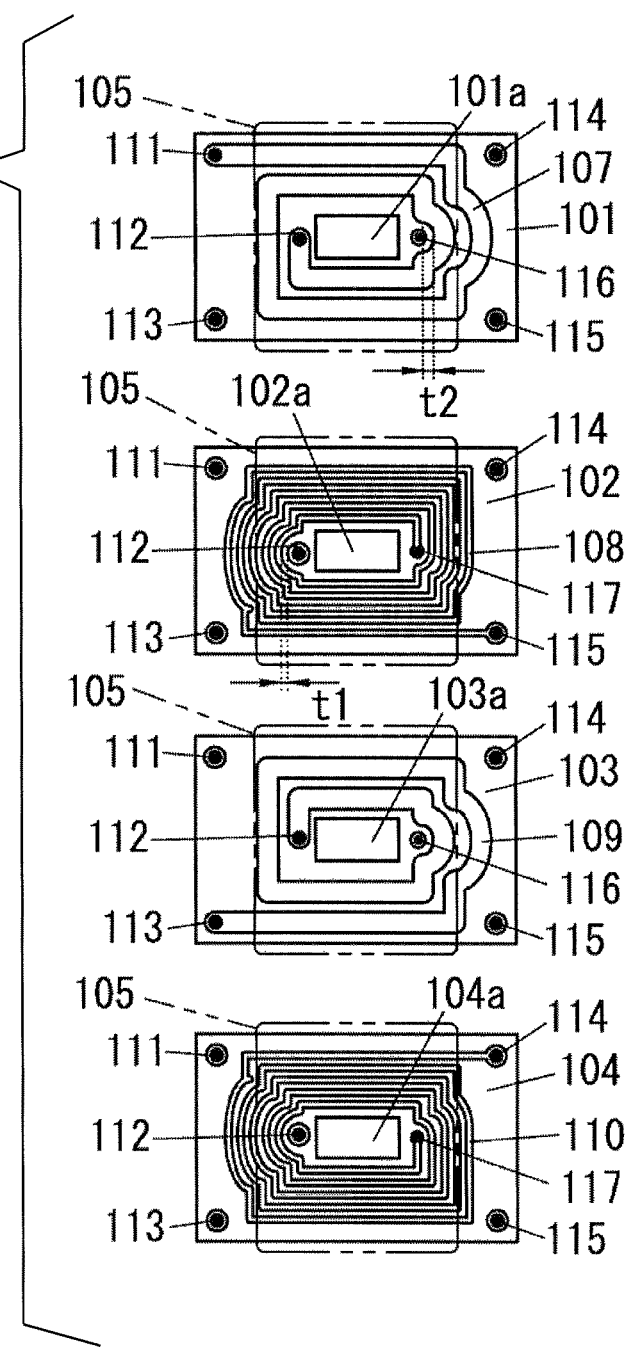
FIG. 29 A shows a front view of the winding member of the transformer in the prior art.
Figure 29:
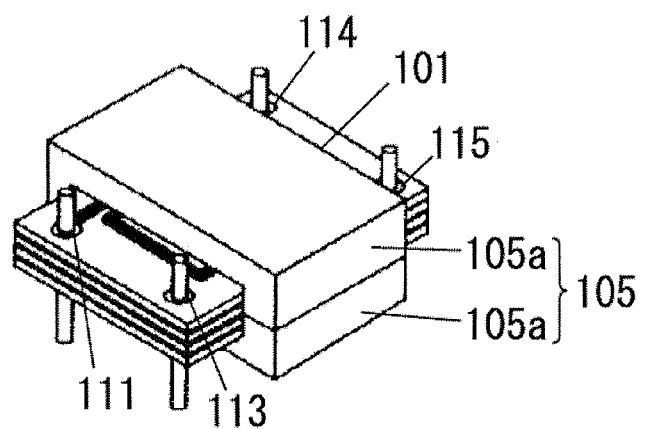
Figure 29:
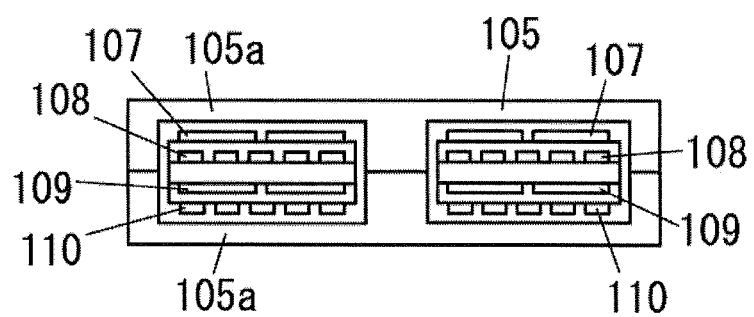

A lighting device, a lighting device for a vehicle, and the vehicle in this embodiment is explained with FIG. 26 to FIG. 28. The lighting device in this embodiment is a lighting device which comprises the transformer explained in any one of first embodiment to the ninth embodiment and which is provided for the head lamp of the vehicle.

The lighting circuit in this embodiment is shown in FIG. 26 A. The lighting circuit in this embodiment comprises a DC-DC converter circuit 43 of flyback type, an inverter circuit 44, and an ignite circuit 45. The DC-DC converter circuit 43 comprises the transformer Tr1, and is configured to convert the power source voltage which is generated by the direct current power source E into the direct current voltage having a predetermined voltage value. The inverter circuit 44 is configured to convert the direct current voltage into an alternating voltage having high frequency. The igniter circuit 45 is configured to generate a high voltage pulse for starting the bulb of the electronic discharge lamp. It is noted that the lighting circuit in this embodiment is well known, except for the transformer Tr1. Therefore, the detail explanation of the lighting circuit is omitted.

FIG. 26 B shows one embodiment of the lighting device in this embodiment. The surface of the substrate 1 of the transformer mounts the DC-DC converter 43 comprising the capacitors C1, C2, the diode D1, the switching element Q1, and the inverter circuit 44. In addition, FIG. 26 C shows another embodiment of the lighting circuit in this embodiment. This case shows the transformer which is disposed on a corner of the substrate 1. Consequently, it is possible to easily assemble the core to the substrate 1. In addition, it is possible to easily fix the core to the substrate 1 by a fixing means (such as tape).

The DC-DC converter circuit 43 is configured to be operated at frequency from "equal to or more than hundreds kHz" to "equal to or less than several MHz". When the direct current power source E is a direct current power source for vehicle (battery), the direct current power source for vehicle has voltage variation from "equal to or more than 5 V" to "equal to or less than 20 V". In contrast, the electric discharge lamp has rated voltage from equal to or more than tens of volts to equal to or less than hundreds of volts. Therefore, a turn ratio of the primary winding to the secondary winding is "equal to or more than in the order of 1:3" to "equal or less than in the order of 1:10". Furthermore, recently, there is a requirement that the head lamp for vehicle has a size of less than 100 cc. In view of the size of the head lamp, it is required for the transformer to have a size of less than 10 cc. In accordance with a size limitation of the transformer, the operation frequency of the transformer and the turn ratio of the transformer are determined.

FIG. 27 shows the lighting device for vehicle employing the lighting device C for the head lamp. FIG. 28 shows a vehicle having the lighting device C for the head lamp.

FIG. 27 shows the lighting device for vehicle in this embodiment. The lighting device for vehicle comprises a lighting device C for the head lamp, the Low beam switching power source 70, and a head lamp LP. The Low beam switching power source 70 is configured to supply the electrical power to the lighting device C for the head lamp. The head lamp LP is configured to receive the electrical power for lighting the head lamp from the lighting device C for head lamp, whereby the head lamp LP is turned on. As shown in FIG. 28, one vehicle D has two pairs of the head lamps LP and the lighting device C for the head lamp, and the Low beam switching power source 70. The lighting device C for head lamp is electrically connected to the Low beam switching power source 70 with an electrical cable 72. Each one of the lighting device C for the head lamp is electrically connected to the corresponding head lamp LP with the electrical wire 71.

When the switch (not shown) is turned on, the Low beam switching power source 70 starts to supply the electrical power to the lighting device C for the head lamp. Under this condition, the lighting device C for the head lamp applies the lamp voltage for stably turning on the corresponding head lamp LP. Consequently, both the head lamp is stably turned on.

That is to say, in accordance with this embodiment, it is possible to realize the lighting device being configured to have the high operation frequency with using the transformer as set forth in any one of the first embodiment to the ninth embodiment, and being configured to have a small size with low loss of output. In addition, the substrate which constructs the transformer mounts the circuit components which construct the lighting circuit. Therefore, it is possible to increase the heat radiation dimension. As a result, it is possible to improve the heat radiation property of radiating the heat generated in the primary winding and the secondary winding. In addition, the lighting device C for the head lamp makes it possible for the lighting device for the vehicle to improve the heat radiation property of the lighting device for the vehicle. Therefore, such the lighting device for the vehicle is able to dispose within a place having a high-temperature such as an engine room.

Although the explanation of the case where the circuit components are mounted on an upper surface of the substrate is made in this embodiment, the mounting position of mounting the circuit components on the substrate 1 is not limited to this embodiment. That is to say, it is possible to mount the circuit components on the lower surface of the substrate 1. Furthermore, it is also possible to mount the circuit components on an upper surface or the lower surface of the substrate disposed in a lower side of the substrate 1. Furthermore, in this embodiment, the electric discharge lamp is used as the load. However, a connected load is not limited to this embodiment. That is to say, it is possible to employ the LED as the load.

EXPLANATION OF THE REFERENCE NUMERAL

1 substrate (first substrate)
2 substrate (second substrate)
3 substrate (first substrate)
4 substrate (second substrate)
1a insertion hole
2a insertion hole
3a insertion hole
4a insertion hole
5 core member
6 winding member
7 patterned conductor (first winding)
8 patterned conductor (second winding)
9 patterned conductor (first winding)
10 patterned conductor (second winding)
16 Interlayer connection member

The invention claimed is:

1. A transformer comprising:
   a winding member; and
   a core member being made of magnetic material, said core member including a middle leg portion and being disposed around said winding member such that said core member forms a magnetic path, wherein:
   said winding member comprises a first substrate and at least two second substrates which are stacked,
   each one of said first substrate and said second substrates is provided with an insertion hole and a patterned conductor which surrounds said insertion hole,
   said insertion hole is provided for passing the middle leg portion of said core member,
   said patterned conductor of said first substrate is defined by a one-turn patterned conductor which has one turn, whereby said patterned conductor of said first substrate defines a first winding,
   said patterned conductor of each of said second substrates defines a second winding,
   said transformer further comprises an interlayer connection member which is configured to electrically connect said patterned conductors of said second substrate, which is stacked, to each other,
   said interlayer connection member is located inward of said one-turn patterned conductor,
   said interlayer connection member is located in an end side of said one-turn patterned conductor, and
   said interlayer connection member is disposed such that a distance between an end portion of said interlayer connection member on a side of middle leg portion and an end portion of said middle leg portion on a side of the interlayer connection member is equal to or more than 0.5 mm.

2. The transformer as set forth in claim 1, wherein:
   said first substrate is provided with first connection terminals which are connected to ends of said first winding, respectively,
   each of said second substrates is provided with second connection terminals which are connected to ends of said second winding, respectively, and
   said first connection terminals are opposite of said second connection terminals from said insertion hole.

3. The transformer as set forth in claim 1, wherein:
   said first substrate is provided with first connection terminals which are connected to ends of said first winding, respectively,
   each of said second substrates is provided with second connection terminals which are connected to ends of said second winding, respectively, and
   said first connection terminals and said second connection terminals are disposed on a same side of said insertion hole.

4. The transformer as set forth in any one of claims 1 to 3, wherein said winding member comprises an even number of said second substrates.

5. The transformer as set forth in any one of claims 1 to 3, wherein:
   said interlayer connection member is disposed within a region surrounded by three planes comprising a first plane, a second plane, and a third plane,
   said three planes are perpendicular to said first substrate and said second substrate,
   the first plane passes through a first point, and a second point,
   the second plane passes through the second point, and a third point,
   the third plane passes through the first point, and the third point,
   the first point is defined by a width center of a first end of said first winding which is pulled out from said core member,
   the second point is defined by a width center of a second end of said first winding which is pulled out from said core member, and
   the third point is defined by a center of a cross section of the magnetic path formed by the middle leg portion.

6. The transformer as set forth in claim 5, wherein:
   said interlayer connection member and said third point are arranged in a predetermined direction,
   a connection line, in a plane of a substrate, which connects the first point to the second point is spaced from said core member by a first distance in said predetermined direction, and
   said first distance is equal to or more than one-half of a width of the cross section of the magnetic path in said middle leg portion.

7. The transformer as set forth in any one of claims 1 to 3, wherein said interlayer connection member is disposed in a predetermined substrate other than a substrate of said first substrate and said second substrate which is disposed adjacent to said core member.

8. The transformer as set forth in any one of claims 1 to 3, wherein:
   said winding member comprises a plurality of said first substrates and a plurality sort of said second substrates,
   the plurality sort of said second substrates are different in a number of turns from each other, whereby
   one of said second substrates is a most-turn substrate having a most number of turns, and
   said most-turn substrate is disposed between said first substrates.

9. A power converter comprising:
   a power conversion circuit having the transformer as set forth in any one of claims 1 to 3,
   wherein at least one of said first substrate and said second substrate mounts a circuit component which constructs said power conversion circuit.

10. A lighting device comprising:
    a lighting circuit having the transformer as set forth in any one of claims 1 to 3,
    wherein at least one of said first substrate and said second substrate mounts a circuit component which constructs said lighting circuit.

11. A lighting device for vehicle comprising said lighting device as set forth in claim 10.

12. A vehicle comprising said lighting device for vehicle as set forth in claim 11.

* * * * *